(12) United States Patent
Rees et al.

(10) Patent No.: US 11,608,591 B2
(45) Date of Patent: Mar. 21, 2023

(54) STABILIZATION OF FABRIC SURFACES

(71) Applicant: ENGINEERED FLOORS LLC, Dalton, GA (US)

(72) Inventors: John Joseph Matthews Rees, Chattanooga, TN (US); Stephen Horace Tsiarkezos, Elkton, MD (US); Dimitri Zafiroglu, Centreville, DE (US); Anthony Daniell, Dalton, GA (US)

(73) Assignee: ENGINEERED FLOORS LLC, Dalton, GA (US)

( * ) Notice: Subject to any disclaimer, the term of this patent is extended or adjusted under 35 U.S.C. 154(b) by 90 days.

(21) Appl. No.: 16/292,834

(22) Filed: Mar. 5, 2019

(65) Prior Publication Data

US 2019/0211499 A1 Jul. 11, 2019

Related U.S. Application Data

(63) Continuation-in-part of application No. 16/031,603, filed on Jul. 10, 2018.

(Continued)

(51) Int. Cl.
*D06M 15/71* (2006.01)
*D06N 3/00* (2006.01)
(Continued)

(52) U.S. Cl.
CPC .............. *D06M 15/71* (2013.01); *B32B 7/04* (2013.01); *D04H 18/02* (2013.01); *D06B 3/10* (2013.01);
(Continued)

(58) Field of Classification Search
CPC .. D06M 15/71; D06M 15/227; D06M 15/263; D06M 15/333; D06M 15/507;
(Continued)

(56) References Cited

U.S. PATENT DOCUMENTS 4,731,274 A 3/1988 Ishida et al.
5,681,408 A 10/1997 Pate et al.
(Continued)

FOREIGN PATENT DOCUMENTS

CA 3069320 A1 1/2019
DE 1560042 A1 10/1969
(Continued)

OTHER PUBLICATIONS

English translation of WO 2015173496-A1 (Year: 2015).*
(Continued)

*Primary Examiner* — Robert S Walters, Jr.
(74) *Attorney, Agent, or Firm* — Patent Portfolio Builders PLLC

(57) ABSTRACT

A textile fabric having improved properties, variously including surface stability, abrasion resistance, resistance to edge fraying, moisture control, and resistance to fluid penetration is created by introducing a polymeric solution or a plurality of low-melting particles suspended in a liquid into the textile fabric while leaving a plurality of surface fibers exposed and maintaining a textile feel on the surface.

18 Claims, 8 Drawing Sheets

Related U.S. Application Data

(60) Provisional application No. 62/530,621, filed on Jul. 10, 2017.

(51) Int. Cl.

| | | |
|---|---|---|
| *D06N 3/12* | (2006.01) | |
| *D06M 15/507* | (2006.01) | |
| *D06M 15/227* | (2006.01) | |
| *D06N 3/04* | (2006.01) | |
| *D06N 3/14* | (2006.01) | |
| *D06M 15/564* | (2006.01) | |
| *D06M 15/333* | (2006.01) | |
| *D06M 15/59* | (2006.01) | |
| *D06M 15/263* | (2006.01) | |
| *D04H 18/02* | (2012.01) | |
| *D06M 15/715* | (2006.01) | |
| *D06B 3/10* | (2006.01) | |
| *D06M 15/705* | (2006.01) | |
| *B32B 7/04* | (2019.01) | |

(52) U.S. Cl.
CPC ........ *D06M 15/227* (2013.01); *D06M 15/263* (2013.01); *D06M 15/333* (2013.01); *D06M 15/507* (2013.01); *D06M 15/564* (2013.01); *D06M 15/59* (2013.01); *D06M 15/705* (2013.01); *D06M 15/715* (2013.01); *D06N 3/0077* (2013.01); *D06N 3/0079* (2013.01); *D06N 3/0088* (2013.01); *D06N 3/04* (2013.01); *D06N 3/042* (2013.01); *D06N 3/045* (2013.01); *D06N 3/123* (2013.01); *D06N 3/125* (2013.01); *D06N 3/14* (2013.01); *D06M 2400/01* (2013.01); *D06N 2203/045* (2013.01); *D06N 2205/02* (2013.01); *D06N 2205/18* (2013.01); *D06N 2209/123* (2013.01); *D06N 2209/128* (2013.01)

(58) Field of Classification Search
CPC .. D06M 15/564; D06M 15/59; D06M 15/705; D06M 15/715; B32B 7/04; D04H 18/02; D06B 3/10; D06N 3/0077; D06N 3/0079; D06N 3/0088; D06N 3/04; D06N 3/042; D06N 3/045; D06N 3/123; D06N 3/125; D06N 3/14; D06N 2203/045; D06N 2205/02; D06N 2205/18; D06N 2209/123; D06N 2209/128

See application file for complete search history.

(56) References Cited

U.S. PATENT DOCUMENTS

| | | |
|---|---|---|
| 5,891,564 A | 4/1999 | Shultz et al. |
| 5,965,232 A | 10/1999 | Vinod |
| 7,425,359 B2 | 9/2008 | Zafiroglu |
| 7,431,975 B2 | 10/2008 | Zafiroglu |
| 2004/0106345 A1 | 6/2004 | Zafiroglu |
| 2004/0175535 A1* | 9/2004 | Bell .................. B29B 17/0042 428/95 |
| 2004/0191470 A1* | 9/2004 | Zafiroglu ............... B29C 70/24 428/96 |
| 2007/0270064 A1 | 11/2007 | Aseere |
| 2008/0082076 A1* | 4/2008 | Kingsford ........... A61F 13/5622 604/391 |
| 2009/0047465 A1 | 2/2009 | Zafiroglu |
| 2010/0000665 A1 | 1/2010 | Newton et al. |
| 2010/0071115 A1 | 3/2010 | Sadato |
| 2013/0280486 A1 | 10/2013 | Zafiroglu |

FOREIGN PATENT DOCUMENTS

| | | | |
|---|---|---|---|
| EP | 0848104 A2 | 6/1998 | |
| EP | 1860223 A1 | 11/2007 | |
| WO | WO-2015173496 A1 * | 11/2015 | ........... B29B 15/127 |

OTHER PUBLICATIONS

International Search Report and Written Opinion dated Oct. 1, 2018 in related International Application No. PCT/US2018/041448.
Extended European Search Report dated Mar. 30, 2021 in related/corresponding EP Application No. 18831839.8.
Office Action dated Jan. 10, 2023 in related/corresponding CA Application No. 3,128,649.
Office Action dated Jan. 7, 2023 in related/corresponding CA Application No. 3,069,320.

\* cited by examiner

STABILIZATION OF FABRIC SURFACES

CROSS-REFERENCE TO RELATED APPLICATIONS

The present application is a continuation-in-part of U.S. patent application Ser. No. 16/031,603 filed Jul. 10, 2018, which claims priority to U.S. Provisional Patent Application No. 62/530,621 filed Jul. 10, 2017. The entire contents of which are incorporated herein by reference.

TECHNICAL FIELD

Embodiments of the subject matter disclosed herein relate to textile sheets and floor coverings.

BACKGROUND

Textile flooring and other textile surface-coverings, for example, wallcoverings and upholstery, at a minimum require surface stability and abrasion resistance. The required surface stability and abrasion resistance are needed without excessive hardening of the surface and with the preservation of at least some "textile feel" or textile look. Textile flooring and textile surface-coverings often have textured three-dimensional surfaces, including highly textured or deeply embossed surfaces, and the structure of the textured three-dimensional surfaces needs to be maintained under severe end use conditions associated, for example, with flooring and upholstery.

While three-dimensionally formed fabrics and flat fabrics with three-dimensional textured surfaces may be abrasion-resistant, the fibers at the cut edges of these fabrics are typically not anchored sufficiently close to the exposed tips at the cut edges. These insufficiently anchored fibers tend to fray or "fuzz". When used as a surface covering such as a floorcovering or wall covering, the fabrics are grouped together, forming seams where adjacent cut edges meet. The grouped fabrics containing the insufficiently anchored fibers can develop visible lines of deterioration over time along the seams, even under conditions of normal use.

Flooring and related surface-covering applications utilizing three-dimensionally formed fibrous surfaces may also require materials and fabrics that provide a combination of breathability and simultaneous resistance to spilled fluid penetration. Breathability is usually defined as the transmission of a minimum amount of water vapor per 24 hrs, and resistance to spilled fluid penetration is usually defined by the British Spill Test. According to the British Spill Test, water dropped onto a sheet of material from a height of 1 meter is required to fail to penetrate and breach the backside of that sheet of material for a period of at least 24 hrs.

Attempts at preventing liquids spilled on the surface of a fabric or floorcovering from breaching the backside have in the past used films or membranes attached to the bottom of the sheet. These arrangements however allow the spills to penetrate the top surface of the sheet of material, and only stop liquid penetration at the bottom. Therefore, the liquid penetrates into the lower layers of the sheet of material. This penetration into the lower layers can promote the formation and growth of bacteria or fungi within the lower layers.

Alternate attempts at using a film or membrane to resist the penetration of spills are described, for example, in U.S. Pat. No. 5,965,232 to Vinod, U.S. Pat. No. 7,425,359 to Zafiroglu and U.S. Pat. No. 7,431,975 to Zafiroglu. These alternate attempts place the membrane between a relatively thin textile fabric surface and a cushioning backing to form a preferably breathable floorcovering that allows water vapors to escape but that resists the penetration of liquids from spills. The membrane is attached to the structure with adhesive layers. These adhesive layers make obtaining good delamination resistance without limiting or fully blocking breathability difficult. U.S. Patent Application Publication No. 2013/0280486 to Zafiroglu discloses a liquid-blocking composite having a fibrous surface layer and a membrane placed directly under the surface layer. The surface layer may optionally have a texture deeper than the original thickness of the fibrous surface layer. The resulting liquid-blocking composite has low breathability and low water vapor transmission capability resulting, at least partially, from the necessity to use relatively high weights of adhesive.

Therefore, a need exists for fabrics, including highly-textured fabrics, that maintain high resistance to abrasion and surface deformation with use, and preferably also block the flow of liquids into the inner layers of the fabric while maintaining a textile appearance and textile texture. The fabrics would also preferably "breathe" to allow the transmission of water vapor. The highly-textured fabrics would have at least a portion of the surface fibers or surface loops exposed and free of adhesive or resin. Therefore, the surface would not lose its textile and fibrous feel by being hardened and solidified. In addition, a need exists for a reliable and flexible method to make these highly-textured fabrics with special face aesthetics, or special properties such as microbial resistance, or soiling resistance.

SUMMARY

Exemplary embodiments are directed to methods for making improved textile fabrics and composites containing fabrics by using a plurality of low-melting polymeric particles deposited onto the surface. The deposited particles are guided into the interstices or gaps among the filaments, fibers or yarns exposed on the top surface of the textile fabric and also into the depressed areas of the textured top surface of the textile fabric. The particles are then activated with heat. The textile fabrics retain a textile feel and may be free-standing or attached to a backing. Suitable backings include, but are not limited to, bulky cushioning backings.

In one embodiment, the deposited low-melting polymeric particles are directed to the more desired areas of the surface of the fabric. In one embodiment, the plurality of low-melting polymeric particles is in the form of a fine powder. In one embodiment, the particles in the plurality of low melting particles include coarser particles. Suitable methods for forming or obtaining these coarser particles include freeze-grinding recycled polymeric textiles.

In one embodiment, the fabrics are flat but have a textured surface. In one embodiment, the textured surface is formed by yarns that loop into and out of the surface, creating elevated areas of yarn and depressed areas of yarn. In one embodiment, the surface is textured by embossing the surface with a three-dimensional pattern. This three-dimensional pattern creates raised areas of fabric and lowered areas of fabric spaced across the textile fabric at intervals larger than spacings among the elevated areas or yarns and depressed areas of yarns and extending into the textile fabric at depths greater than the depths of the depressed areas of yarns. In one embodiment, the raised and lowered areas of fabric extend to a depth that is greater than the original thickness of the textile fabric.

Both the type of particle and the technique used for particle deposition are selected to ensure that the deposited particles at the elevated areas of yarns or the raised areas of textile fabric stay primarily within a short depth under the top surface of the textile fabric. In one embodiment, the plurality of particles is deposited onto the fabric by sifting, with or without the help of vacuum, blowing of air, or vibration during or after deposition. Particle size is chosen to approach, match, or exceed the dimensions of the interstices or gaps of the fabric surface to avoid excessive propagation below the top surface. Therefore, the particles, as deposited, remain on the top surface or within the upper strata of the fabric.

In one embodiment, the deposited particles are activated with heat. Suitable heat sources include, but are not limited to, radiant heat, hot air, and a heated contact surface applied with low pressure. In one embodiment, activation of the deposited particles is achieved by raising the temperature of the entire fabric to a level sufficient to melt the particles. In one embodiment, the particles are activated as the fabric is embossed with the three-dimensional pattern using a heated tool equipped with surface projections. In one embodiment, the particles are activated while the fabric is laminated to a barrier layer or to a backing layer. Lamination to the barrier layer or backing layer can be achieved with a relatively flat heated tool resulting in a composite with the general pattern of the texture originally formed in the fabric preserved. Alternatively, lamination to the backing layer is achieved with a three-dimensional heated tool forming deeper and coarser face textures that exceed the original thickness of the fabric. Embossing with a depth exceeding the original thickness of the fabric may utilize a soft and resilient back-up tool such as silicon rubber. Embossing against a conformable cushioning backing removes the need for a soft back-up tool as the fabric forms into the backing.

In one embodiment, the depth to which the resulting melted particle resin proceeds into the interstices or gaps among the surface fibers is controlled by adjusting the melt index of the deposited particles, e.g., the powdered resin. In one embodiment, the degree of propagation of melted particle resin into the textile fabric is further controlled through the selective application of hot air or cold air to the top surface of the textile fabric. In one embodiment, vacuum is applied under the fabric, i.e., to the bottom surface opposite the top surface, or under the composite containing the textile fabric as a face layer to control the degree of propagation of the melted particle resin into the fabric.

Exemplary embodiments utilize limited amounts or levels of particles to prevent the addition of significant weight to the fabric while still improving surface durability at the elevated areas of yarns or raised areas of fabric, fuzzing resistance at the cut edges, and overall fluid penetration resistance. Limited levels of deposited particles achieve these improvements without eliminating the fibrous feel of the top surface of the textile fabric or composite into which the textile fabric is incorporated. In one embodiment, the deposited particles are directed preferentially toward the lowered areas of a deeply embossed textile fabric to overcome the locally reduced resistance to fluid penetration by the embossing action.

In one embodiment, the textile fabric or floorcovering is treated with repellent solutions before or after the application of low-melt powder. In one embodiment, elevated areas of yarns are relieved of the extra deposited powder, and the extra powder is moved into the depressed areas of yarns, by brushing, preferably as vacuum is applied underneath.

In one embodiment, the exposed "high-profile" or "elevated" areas of the top surface of the fabric are stabilized by using a limited weight of particles or powder containing relatively coarser particles so that only parts of the elevated areas of yarns are covered by the resulting melted particle resin and parts are exposed to preserve a textile feel.

In one embodiment, the particles, are sifted upon the textile fabric. In another embodiment, the particles are incorporated into a liquid, e.g., water, and the suspension is applied to the top surface of the fabric. In one embodiment, an additional wet brushing with liquid free of particles is applied to the top surface of the textile fabric in the elevated areas of yarns or raised areas of textile fabric to drive particles into the fiber interstices before the textile fabric is dried and the particles are melted. The liquid in the suspension can be evaporated following application, for example, by heating in an oven, using radiant heat, applying a vacuum or blowing hot air.

In one embodiment, the depth of penetration of the particles is regulated by selecting the size of the particles in comparison to the size and density of the fibers or yarns on the surface of the fabric. In one embodiment, vacuum is applied to a bottom surface of the fabric opposite the top surface as the fabric is vibrated during or after the deposition of the particles. Vacuum and vibration are also used to control the depth of penetration of the particles. In one embodiment, the applied particles have the same size. Alternatively, particles having different configurations, compositions or densities are applied simultaneously or in consecutive stages. In one embodiment, a mixture of particle sizes is used to allow some of the finer particles to penetrate the surface fibers or yarns while some of the coarser particles stay over the top surface. This mixture of particles further improves the abrasion resistance of the top surface. In one embodiment, the coarser particles settle at the depressed areas. After heat is applied to melt the coarser particles, the resulting melted particle resin remains locally above the fibers at a lower profile than the elevated areas of yarns or raised areas of fabric without causing the loss of textile and fibrous surface aesthetics.

Suitable particles include, but are not limited to, fine polymeric powders commercially used in processes such as the bonding of non-wovens and coarser powders produced by grinding low melt polymers including polymers contained in recycled fabrics or floorcoverings. These powders contain particles having a range of particle sizes suitable for use with the fabrics. Suitable particles also include particles derived and extracted from recycled textiles containing low-melting fibers or films grounded into appropriately fine particle or powder size.

In one embodiment, non-melting fine elements are mixed with the plurality of particles either before or after the application of the particles in order to obtain special effects. These fine elements and desired effects include colored particles for aesthetic purposes, hard particles to increase resistance to abrasion, and particles reacting to moisture or heat to produce special visual or functional effects, including but not limited to breathability, moisture absorbency and moisture repellency at the surface.

In one embodiment, the original fabric contains a fluid barrier layer that upon deep embossing stays intact at the elevated areas of yarns and raised areas of textile fabric but is perforated and compromised at the highly compressed and indented lowered areas of textile fabric. Preferential deposition of powder into the lowered areas of textile fabric partially or totally seals the compromised lowered areas without seriously affecting the fibrous feel of the raised areas.

In one embodiment, particles having at least one of larger sizes and lower melt indexes that tend to stay on the top surface are combined with, preceded by, or followed by finer or higher melt-index particles that tend to penetrate in order to create special surface effects. In one embodiment, the particles include a mixture of ground recycled high-melt and low-melt fabrics, textiles or polymers, mixed with at least one of low melt powders, high melt powders, other non-melting particulates and special-effect particulates. These additional powders are added to affect one or more of color, abrasion resistance, surface absorbency, repellency and bacterial resistance among other surface properties.

Exemplary embodiments are directed to a textile fabric having a plurality of yarns. The yarns have a yarn melting point. The yarns include upper parts adjacent a top surface of the textile fabric. A plurality of filaments forms the yarns with a plurality of gaps disposed among the filaments. The textile fabric includes a plurality of elevated areas of yarns and depressed areas of yarns formed by the plurality of yarns looping in and out of the fabric. Melted particle resin resulting from a plurality of particles being dispersed in gaps located in the elevated areas of yarns and melted is contained in the textile fabric. The plurality of particles has a particle melting point lower than the yarn melting point. The elevated areas of yarns include sections of filaments free of melted particle resin. In one embodiment, the melted particle resin is concentrated in the upper parts of the yarns in the elevated areas of yarns, under the surface itself.

In one embodiment, the textile fabric also includes a barrier layer attached to a bottom surface opposite the top surface and a macro-pattern embossed into the textile fabric. The macro-pattern includes raised areas of the textile fabric and lowered areas of the textile fabric. Adjacent raised areas and adjacent lowered areas are spaced at intervals wider than the spacing between adjacent elevated areas of yarns and depressed areas of yarns. In addition, the lowered areas of the textile fabric have a lowered area depth that is deeper than a depressed area depth formed originally by the yarns. In one embodiment, the particles are present within the lowered areas of the textile fabric at a higher concentration than within the raised areas of the textile fabric, and the melted particle resin in the lowered areas of the textile fabric is located below a level of the raised areas.

In one embodiment, the textile fabric is a nonwoven layer formed with filaments or staple fibers. In one embodiment, the textile fabric includes a cushion layer attached to the barrier layer. In one embodiment, the plurality of gaps has a plurality of gap widths. These plurality of gap widths include widths less than about 100 microns. In one embodiment, the particles in the plurality of particles have a particle diameter of from about 400 microns to about 700 microns. In one embodiment, the particles in the plurality of particles are dispersed at a weight of up to about 2.6 oz/yd$^2$. The plurality of particles includes at least one of low-melting particles and non-melting particles configured to impart at least one of desired properties or visual effects to a top surface of the textile fabric.

Exemplary embodiments are also directed to a method for improving surface and cut-edge stability of a textile fabric having a textured surface without losing the fibrous feel of the surface. A textile fabric having a plurality of yarns and a plurality of gaps disposed within the yarns is selected. The yarns loop into and out of the textile fabric forming a pattern of elevated areas of yarns and depressed areas of yarns. The yarns have a yarn melting point. A plurality of particles is dispersed on the textile fabric. The particles have a particle melting point lower than the yarn melting point. At least a portion of the plurality of particles are caused to enter the gaps within the elevated areas of yarns on a top surface of the fabric. The plurality of particles is melted in situ to create melted particle resin, and at least a portion of the filaments in the yarns within the elevated areas are left free of melted particle resin.

In one embodiment, a first plurality of particles on the textile fabric is dispersed at a first time, and a second plurality of particles is dispersed on the textile fabric at a second time. The first plurality of particles is separate from the second plurality of particles, and the first time and second time are discrete periods of time. In one embodiment, the plurality of particles is dispersed across the textile fabric in accordance with a predetermined pattern by sifting the plurality of particles onto a top surface of the textile fabric. In addition, at least one of applying vacuum to a bottom surface of the textile fabric opposite the top surface, vibrating the textile fabric, blowing air onto the top surface, sweeping the top surface, brushing the top surface, and cold pressing the textile fabric is performed to minimize particle exposure at the elevated areas of yarns and to promote particle concentration at the depressed areas of yarns.

In one embodiment, dispersing the plurality of particles includes incorporating the plurality of particles into a liquid suspension, applying the liquid suspension to the top surface of the textile fabric and evaporating liquid from the liquid suspension after applying the liquid suspension to the top surface. In one embodiment, the textile fabric is embossed prior to dispersing the plurality of particles with a macro pattern containing raised areas of the textile fabric and lowered areas of the textile fabric. The plurality of particles is directed to concentrate at the lowered areas using at least one of vacuum, brushing, sweeping, vibration and cold pressing. In one embodiment, a barrier layer is attached to a bottom face of the fabric opposite the top face. In one embodiment, a cushioning backing layer is attached to the barrier layer.

Exemplary embodiments are also directed to a method for creating a liquid-blocking three-dimensionally textured textile fabric with a highly durable and fibrous textile surface and non-fraying cut edges. A textile fabric having filaments on a top surface and a liquid blocking barrier attached to a bottom surface opposite the top surface is embossed using an embossing pattern that forms raised areas of fabric and lowered areas of fabric on the top surface. A plurality of particles is dispersed on the top surface, and the particles deposited on the raised areas to are directed enter the gaps between the filaments. The particles disposed on the top surface move towards and into the lowered areas, and heat is applied to melt the particles in the gaps and the particles that moved into the lowered areas. A sufficient amount of particles are moved into the lowered areas that melted particle resin resulting from the particles in the lowered areas being melted seals the lowered areas and eliminates failure of the liquid blocking barrier due to the embossing action.

In one embodiment, at least one of vacuum, brushing, sweeping, vibration, blown air and cold pressing is used to move the particles into the lowered areas. In one embodiment, a backing layer is attached to the barrier layer. In one embodiment, at least one of low-melting particles and non-melting particles selected to impart at least one of desired properties or visual effects to the top surface are dispersed on the top surface.

In one embodiment, polymers are dissolved in suitable chemicals and applied to the surface of the various fabrics in amounts and viscosities confining the penetration of the dissolved polymer near the surface. Additional solvent is then applied to the surface to force part of or all the polymeric solution under the surface before applying heat, forced air, vacuum, or combinations thereof to evaporate the solvent and leave most of the dissolved polymer in a layer under the surface, maintaining the textile feel of the surface.

In one embodiment, the liquid suspension or polymeric solution is applied by immersion, including partial immersion of the fabric and complete immersion of the fabric to reach the entire fabric. In one embodiment, immersion of the fabric is followed by one or more of squeezing or applying pressure to the fabric, applying vacuum to the fabric or directing forced air on the fabric to extract any extra liquid from the fabric. In one embodiment, additional liquid or solvent is applied to the surface of the fabric before applying heat to the fabric to drive the particles or the polymer solution under the surface, preserving the fibrous look and feel of the surface.

The use of a polymeric solution improves the ability to reach the interstices between fibers, fiber bundles or the spaces within and around yarns and yarn bundles. In addition, the viscosity of the polymeric solution can be adjusted by adjusting the ratio of polymer to solvent. Volatile solvents are selected to ensure evaporation without residue to avoid secondary problems such as soiling.

Exemplary embodiments are directed to a method for stabilizing a textile fabric that suspends a plurality of polymeric particles in a liquid to create a liquid suspension of polymeric particles and applies the liquid suspension of polymeric particles to the textile fabric. In one embodiment, a plurality of polyester, polyethylene, polypropylene polyurethane, polyvinyl acetate, polyvinyl alcohol, polyamide or acrylic particles are suspended in the liquid. In one embodiment, at least a portion of the polymeric particles have a chemical composition that is compatible with fibers in the textile fabric to form chemical bonds with the fibers. In one embodiment, at least a portion of the polymeric particles is ground recycled textile products containing powderized low melt content. Suitable liquids include water and water containing surfactants.

In one embodiment, the liquid suspension is applied by immersing the textile fabric in the liquid suspension. In one embodiment, the liquid suspension is applied uniformly to a top surface of the textile fabric. In one embodiment, an initial volume of the liquid suspension is applied to the top surface of the textile fabric. The initial volume is sufficient to penetrate from the top surface into the textile fabric with a penetration depth that is less than a thickness of the textile fabric.

An additional volume of the liquid is applied to a top surface of the textile fabric. The additional volume is sufficient to carry at least a portion of the plurality of polymeric particles into the textile fabric and away from the top surface. In one embodiment, the additional volume of the liquid is applied to the top surface by wet brushing the liquid onto the top surface, wet rolling the liquid onto the top surface, spraying the liquid onto the top surface, or combinations thereof. In one embodiment, additives having a melting point that is higher than the temperature applied to the textile fabric are incorporated into at least one of the liquid suspension of particles and the additional volume of liquid. The additives affect at least one of a color of the textile fabric, an abrasiveness of the textile fabric, an absorptiveness of the textile fabric and antimicrobial properties of the textile fabric. In one embodiment, a repellent is added into at least one of the liquid suspension of particles and the additional volume of liquid.

Heat is applied to the textile fabric. The applied heat is sufficient to evaporate the liquid applied to the textile fabric and to melt the plurality of polymer particles in situ. In one embodiment, a textile fabric containing a plurality of looping yarns is selected. The plurality of looping yarns includes an upper portion adjacent the top surface. In one embodiment, the textile fabric is embossed with a coarse pattern containing elevated areas and depressed areas. The liquid suspension is applied only to the elevated areas of the textile fabric embossed with the coarse pattern. In one embodiment, the textile fabric containing the melted polymeric particles is needled with smooth fine needles to facilitate water vapor penetration through the textile fabric.

Exemplary embodiments are also directed to a method for stabilizing a textile fabric that dissolves a polymer in a solvent to create a polymeric solution and applies the polymeric solution to the textile fabric. In one embodiment, polyesters, polyurethanes, polystyrenes, acrylics or polyamides are dissolved in the solvent. In one embodiment, the polymers are dissolved in a volatile organic solvent. In one embodiment, the dissolved polymer has a chemical composition that is compatible with fibers in the textile fabric to form chemical bonds with the fibers. In one embodiment, at least a portion of dissolved polymer is ground recycled textile products.

In one embodiment, an initial volume of the polymeric solution is applied to the top surface of the textile fabric. The initial volume is sufficient to penetrate from the top surface into the textile fabric a penetration depth that is less than a thickness of the textile fabric. In one embodiment, the polymeric solution is applied in a plurality of discrete applications. In one embodiment, a viscosity of the polymeric solution is varied among the plurality of discrete applications by varying a ratio of polymer to solvent in the polymeric solution. In one embodiment, the textile fabric blocks water and passes water vapors.

An additional volume of the solvent is applied to a top surface of the textile fabric. The additional volume is sufficient to carry at least a portion of the dissolved polymer into the textile fabric and away from the top surface. In one embodiment, additives having a melting point that is greater than a temperature of the heat applied to the textile fabric are incorporated into at least one of the polymeric solution and the additional volume of solvent. The additives affect at least one of a color of the textile fabric, an abrasiveness of the textile fabric, an absorptiveness of the textile fabric and antimicrobial properties of the textile fabric. In one embodiment, a repellent is incorporated into at least one of the polymeric solution and the additional volume of solvent.

At least one or more of forced air, vacuum and heat is applied to the textile fabric to evaporate the solvent applied to the textile fabric and to set the polymer in situ. In one embodiment, a nonwoven textile fabric formed with filaments or staple fibers or a textile fabric containing a plurality of looping yarns that form the top surface is selected. In one embodiment, a textile fabric containing a plurality of looping yarns is selected. The plurality of looping yarns includes an upper portion adjacent the top surface. In one embodiment, the textile fabric is a stitchbonded fabric containing loops of yarn that form the top surface. In one embodiment, the textile fabric is embossed with a coarse pattern containing elevated areas and depressed areas. The polymeric solution is applied only to the elevated areas of the textile fabric embossed with the coarse pattern.

BRIEF DESCRIPTION OF THE DRAWINGS

The accompanying drawings, which are incorporated in and constitute a part of the specification, illustrate a plurality of embodiments and, together with the following descriptions, explain these embodiments.

DETAILED DESCRIPTION

Figure 1:
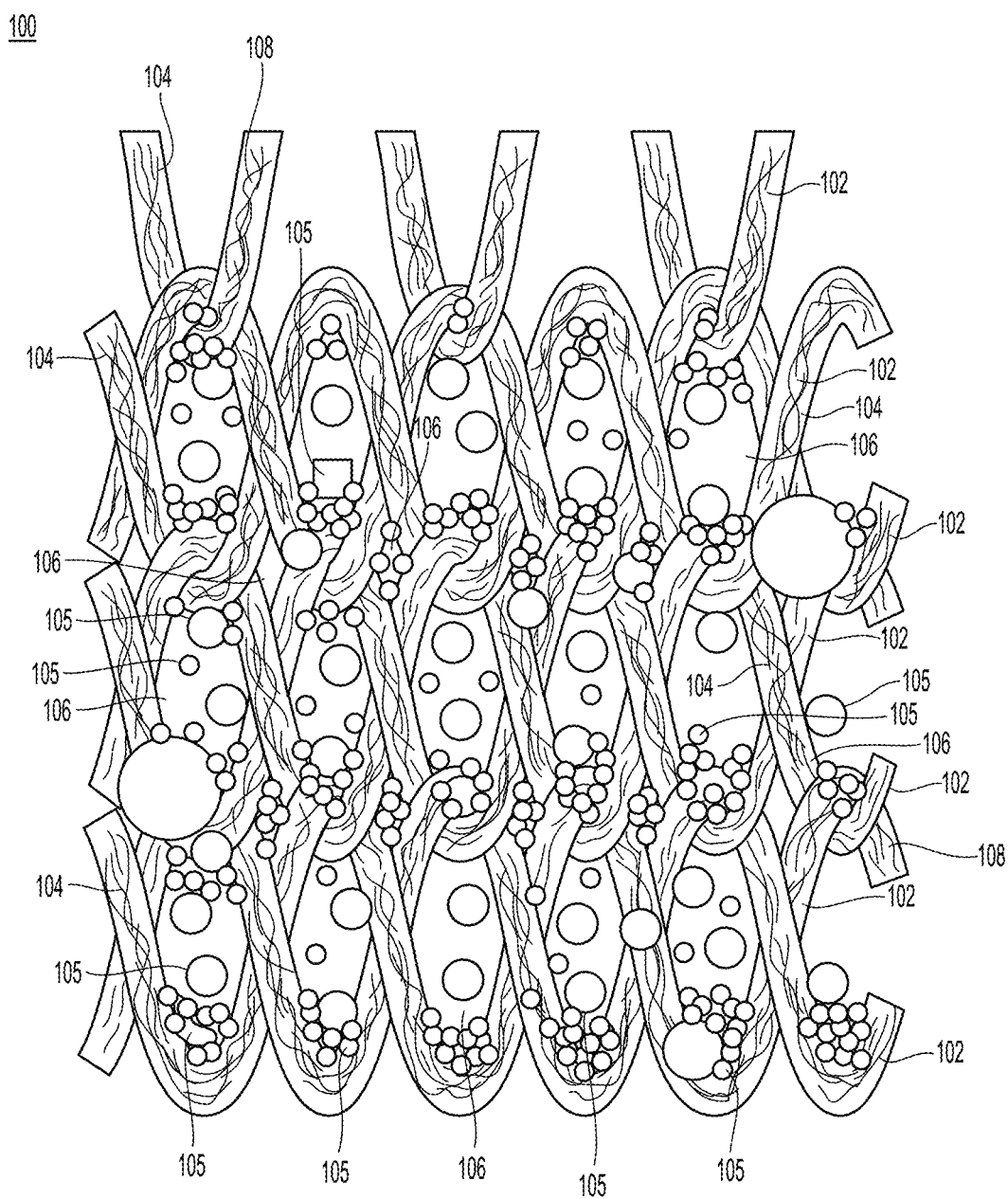
FIG. 1 is a schematic representation of a top view of a textile fabric with a plurality of particles dispersed over the top surface.

The following description of the embodiments refers to the accompanying figures. The same reference numbers in different figures identify the same or similar elements. Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Exemplary embodiments are directed to incorporating low-melting adhesive particles or powders into the surface of a textile fabric. In one embodiment, the particles are deposited onto the top surface of the textile fabric by sifting. In another embodiment, the particles are applied to the top surface of the textile fabric or floor covering as a suspension in a fluid. Suitable fluids include, but at not limited to, water and water containing surfactants mixed in low percentage levels. In all embodiments, the textile fabric or floor covering has a three-dimensional surface. The three-dimensional surface of the fabric includes elevated areas of yarns and depressed areas of yarns. In one embodiment, the fabric is attached to a backing. In one embodiment, the particles descend into the interstices between and among the surface fibers. In one embodiment, the particles descend into the gaps between yarns that form the surface of the fabric. In one embodiment the particles also descend into the depressions or spaces that may be formed as the yarns are inter-looped along a generally flat surface.

The deposited particles are melted by raising the temperature of the surface of the fabric or of the entire fabric. In one embodiment, a fabric formed with looping yarns entering and exiting the surface is deeply embossed with patterns coarser than the patterns formed by the yarns. In one embodiment the depth of the embossed patterns exceeds the pre-embossed thickness of the fabric. The embossed patterns include raised areas of fabric and lowered areas of fabric. The particles, depending upon their size and shape may proceed by gravity predominantly into the lowered areas of fabric compared to the particles in the raised areas of fabric. As the deposited particles melt to form melted particle resin, the melted particle resin flows to fill-in the gaps and interstices and increase resistance to fluid penetration in the lowered areas, which may have been previously thinned-out or perforated during embossing, lowering resistance to fluid penetration.

Depending upon the structure of the top surface of the fabric, the nature of the surface fibers or yarns, the amount of deposited particles, the melt characteristics of the particles, and the structure of the deposited particles, different advantages and improvements in different embodiments are achieved in the textile fabric. These advantages and improvements include, but are not limited to, simple stabilization of the elevated areas of yarns and raised areas of fabric versus wear and abrasion, achieving a breathable fluid barrier with minimum hardening of the textile fabric surface, and blocking of fluid penetration through the textile fabric without excessive hardening and without eliminating the fibrous feel of the top surface.

Referring initially to FIG. 1, exemplary embodiments are directed to a textile fabric 100 containing a plurality of yarns 102. As illustrated, the yarns are arranged as a knit textile fabric. However, the yarns can also form other types of textile fabrics including, for example, woven fabrics, stitch-bonded textile fabrics and tufted textile fabrics. In general, the yarns have a yarn melting point. Each yarn is constructed from and contains a plurality of distinct filaments or individual fibers 104.

The textile fabric includes a plurality of gaps disposed within and among the yarns. These gaps in the plurality of gaps include spacings 106 between yarns in the plurality of yarns. The size and shape of the individual spacings varies.

These gaps also include openings 108 between individual filaments within each yarn. The size and shape of the individual openings vary between different pairs of filaments and along the length of filaments as the filaments are twisted and entangled. In general, each gap has a gap width. Therefore, the plurality of gaps represents a plurality of gap widths. Each opening within the yarns has an opening gap width, and each spacing between yarns has a spacing gap width, which includes larger spacing gap widths and smaller spacing gap widths. The size of the gap width can vary along the length of the gap. In one embodiment, an individual gap width is the largest measured distance across the gap. As used herein, the gap width refers to a size or dimension of a largest object or particle that can pass through the gap. Suitable dimensions include the diameter of a sphere or the diagonal of a cube. The gap widths associated with the openings between filaments are smaller than the gap widths associated with the spacings between yarns. In one embodiment, the plurality of gap widths includes widths less than about 500 microns. In one embodiment, the plurality of gap widths includes widths of from about 400 microns to about 500 microns. In one embodiment, the plurality of gap widths includes widths less than about 100 microns.

The textile fabric includes a plurality of particles 105 dispersed across the textile fabric within the yarns. In one embodiment, the particles in the plurality of particles include particles have the same size and shape. In another embodiment, the particles in the plurality of particles include particles that vary in at least one of size and shape. As illustrated, the particles may include spherical particles. These spherical particles can include small particles that are smaller than the gap width of all of the spacings in the textile fabric, medium particles that are smaller than the gap width of some of the openings but larger than the gap width of other openings, and large particles that are larger than the gap width of all openings. The particles will pass into the gaps having a gap width larger than the particles. The large particles will remain on the top surface of the textile fabric. In one embodiment, a portion of the small and medium particles remain on the top surface of the textile fabric and do not pass into the openings. In addition to spherical particles, suitable particles include particles having other shapes including, for example, cubic particles and non-uniformly shaped particles.

Figure 2:
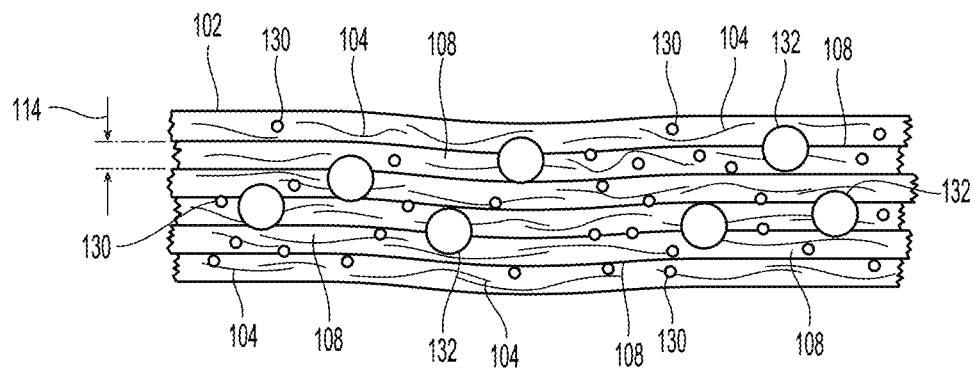
FIG. 2 is a schematic representation of an embodiment of a portion of a yarn illustrating the filaments forming the yarn, the gaps among the filaments, and the particles deposited on the yarns.

Referring to FIG. 2, the size and shape of the particles are also selected based on the gap widths of the openings between filaments in the individual yarns. In one embodiment, the plurality of particles includes a first size of particles 130 that are small enough to pass through or to penetrate the openings between filaments. In one embodiment, the plurality of particles includes a second size of particles 132 larger than the first size of particles that may penetrate the spacings between yarns but is too large to pass through the openings between filaments. In one embodiment, the textile fabric includes both the first size and the second size of particles.

The particles within the plurality of particles are dispersed in at least one of the openings between filaments and the spacings between yarns. In one embodiment, the plurality of particles includes particles having a size smaller than at least one gap width in the plurality of gap widths. In one embodiment, the particles in the plurality of particles have a nominal particle size of about 82 microns. In one embodiment, the particles in the plurality of particles have a particle size of about 400 microns to about 700 microns.

Suitable materials for the particles include, but are not limited to, plastics and polymers. In one embodiment, the particles include at least one of polyester particles and polyethylene particles. In one embodiment, the particles are formed from a material or materials having a particle melting point temperature lower than the melting point of the fibers within the yarns. Therefore, the particles can be subjected to heat and melted without melting the yarns.

Returning to FIG. 1, the arrangement, distribution and density of particles is shown for illustrative purposes. The particles in the plurality of particles are introduced onto a top surface of the textile fabric in accordance with a predetermined density and distribution of particles. Therefore, the textile fabric can include areas of overlapping or stacked particles and areas containing few if any particles. In one embodiment at least one of a pre-determined distribution of the plurality of particles across the textile fabric and a depth of penetration of particles in the plurality of particles into from the top surface through the gaps and into the fabric are established. The textile fabric has upper strata, i.e., the portion of the textile fabric adjacent the top surface, and in one embodiment, a desired depth of penetration is established such that a majority of the plurality of particles are located within the upper strata. Suitable methods for establishing the desired distribution of particles include, but are not limited to, sifting the plurality of particles onto the top surface and applying the particles in the liquid suspension. In one embodiment, the particles in the plurality of particles are dispersed within the yarns at a weight of up to about 2.6 oz/yd$^2$.

Figure 3:
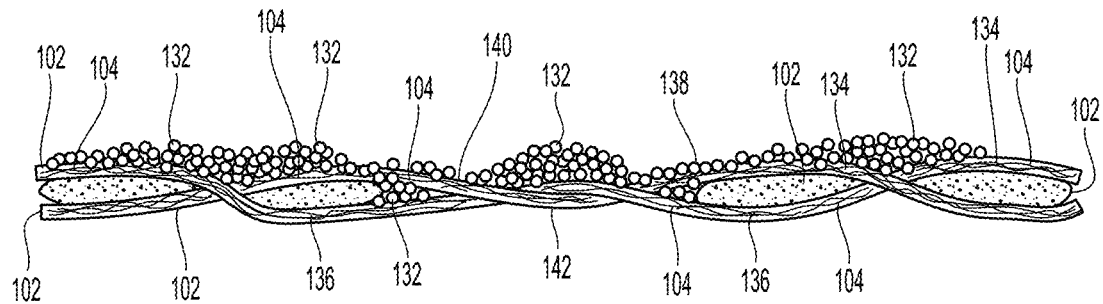
FIG. 3 is a schematic cross-sectional side view of the fabric of FIG. 1.

Referring now to FIG. 3, the yarns in the plurality of yarns form a textured surface pattern that creates elevated areas of yarns 134 and depressed areas of yarns 136. A given yarn following the textured surface pattern can transition from an elevated area of yarn to a depressed area of yarn across the surface of the textile fabric. In one embodiment, the desired pattern of distribution of particles is varied in accordance with the location of the elevated areas of yarns and depressed areas of yarns. In one embodiment, the particles in the plurality of particles have a particle size greater than a size of the gaps among the plurality of surface fibers in the elevated areas. In one embodiment, the particles in the plurality of particles include larger particles and smaller particles. Most of the smaller particles pass into the gaps among the surface fibers. The remainder of the particles, including the larger particles, fall into or are guided into the depressed areas of yarns using, for example, vacuum, blown air, vibration, surface brushing, or a combination of two or more of these guiding methods.

The particles in the plurality of particles are introduced or applied to the top surface 140 of the textile fabric, for example, using sifting or application in a liquid suspension. In one embodiment, both the desired pattern of particles and the desired depth of penetration can be adjusted using vacuum that is applied to a bottom surface 142 of the textile fabric opposite the top surface 140. In one embodiment, vacuum is applied to the bottom surface simultaneously with introduction of the plurality of particles onto the top surface. Other techniques of distributing particles across and within the textile fabric can also be used either alone or in combination with the application of vacuum. In one embodiment, the fabric is vibrated to control the depth of penetration of the plurality of particles.

In one embodiment, the textile fabric also includes a water-repellent coating. In one embodiment, the water-repellent coating is applied and cured to the textile fabric before the plurality of particles is introduced onto the top surface. Alternatively, the water-repellent coating is applied after the plurality of particles is introduced onto the top surface and cured as the particles are melted with heat.

The applied particles are contained within the textile fabric as discrete particles. In addition, particles that are larger than the gap widths remain on the top surface of the textile fabric. In order to incorporate the particles into the textile fabric, the particles in the plurality of particles are melted using applied heat. Suitable methods for applying heat to a textile fabric are known and available in the art and include using radiation, hot air or a heated surface in light contact with the elevated areas of the top surface.

In one embodiment, the textile fabric is cooled following heating to melt the plurality of particles. After heating and cooling, at least a portion of the plurality of surface yarns or filaments within the surface yarns within elevated areas of yarns of the textile fabric are free of melted particles. Applying heat to melt the plurality of particles improves at least one of overall durability, fluid penetration resistance and cut-edge fraying resistance of the fabric. In one embodiment, vacuum is applied to the bottom surface of the fabric while applying heat to the top surface to melt the plurality of particles.

Figure 4:
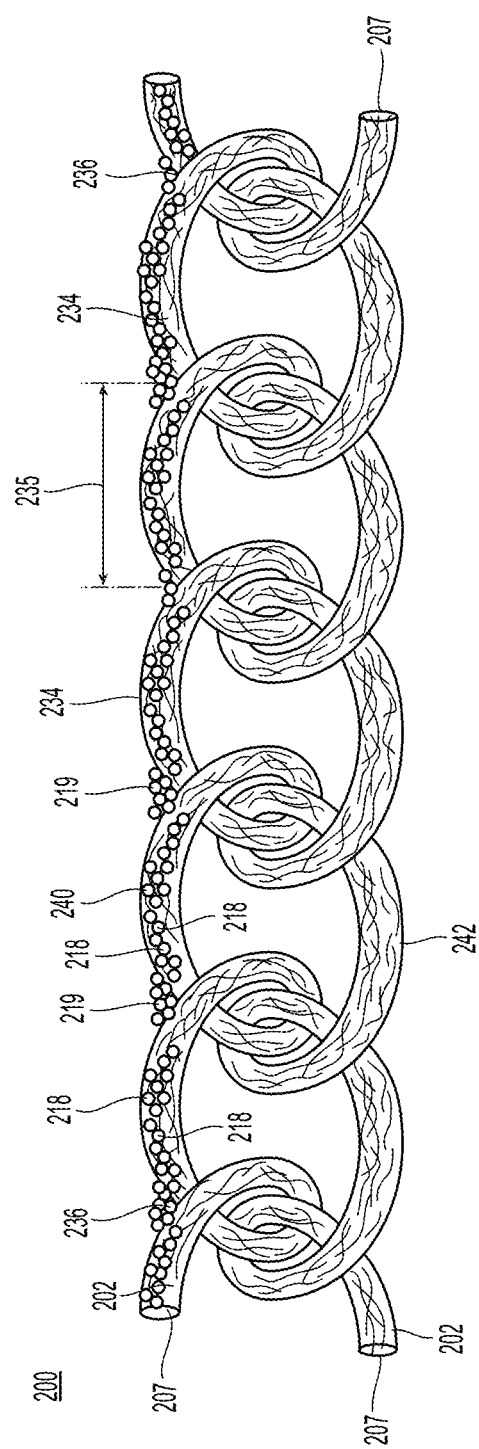
FIG. 4 is a schematic representation of a side view of an embodiment of a textile fabric containing an arrangement of a plurality of particles.

Referring now to FIG. 4, an embodiment of the textile fabric 200 is illustrated. As illustrated, the textile fabric includes a plurality of yarns 202 looping in and out of the top surface 240 and the bottom surface 242 of the textile fabric with a given repeating interval 235. In one embodiment, the yarns are bulked and gaps among the yarn-forming filaments or fibers are present. The plurality of yarns in the textile fabric form a textured surface pattern of elevated areas of yarns 234, wherein the bulked yarns remain bulked and the gaps between filaments or fibers remain open, and depressed areas of yarns 236, wherein the inter-looped yarns are compressed and the gaps widths among filaments or fibers is reduced. When cut to size, the yarn ends at the cut edges 207 are vulnerable to fray and "fuzz".

Particles ranging from particles 218 that are smaller than the gap widths among the fibers or filaments of the yarns, to particles 219 that are larger are applied to the top surface of the fabric. Application of the particles is followed by the application of heat at a temperature above the melting point of the particles but below the melting point of the fibers or filaments in the yarns. Within the elevated areas of yarns most of the particles 218 proceed into the surface gaps and are located under the exposed surface of the yarns, leaving the fibers or filaments forming the yarns mostly exposed. Within the depressed areas of yarns the particles tend to accumulate towards the center of the depressed areas. Most of the large or small particles remaining over the elevated areas can be propelled into the depressed areas using vacuum, vibration or brushing applied either simultaneously or sequentially.

After heat is applied to melt the particles the melted particle resin at the elevated areas of yarns, including the majority of melted particle resin located within the yarns and the small amount of melted particle resin located at or near the top surface improve surface abrasion resistance and edge fraying resistance The melted particle resin and solid particles within the depressed areas of yarns may remain on the top surface without affecting the fibrous feel of the fabric as melted particle resin and solid particles on the top surface are located below and surrounded by the elevated areas of yarns. In summary, applying heat toward the top surface melts the particles to produce melted particle resin which flows 22 in the molten state and bond the fibers and filaments within the yarns and adjacent yarns to each other. This bonding with melted particle resin stabilizes the textile fabric top surface and the cut edges while leaving the top surface with a textured and textile feel.

Figure 5:
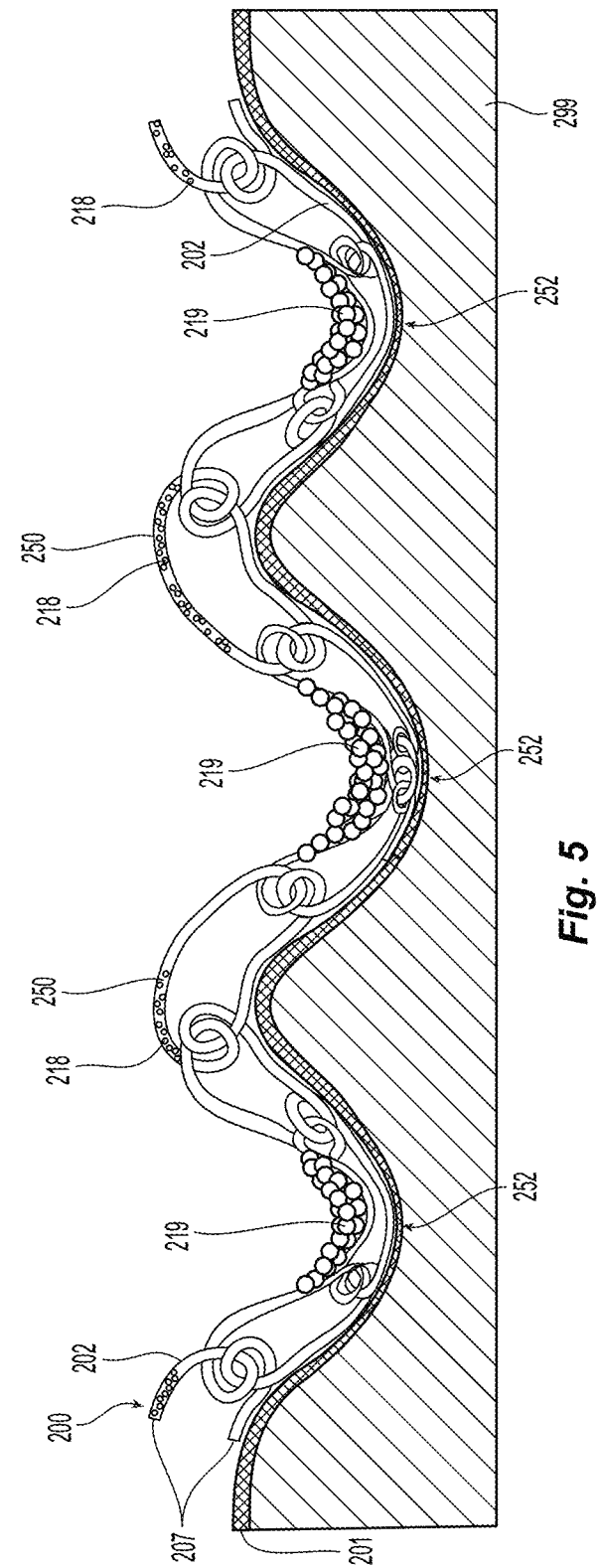
FIG. 5 is the schematic representation of a cross-section of an embodiment of a textile fabric placed over a barrier layer, embossed with a macro pattern and containing an arrangement of a plurality of particles.

Referring now to FIG. 5, in one embodiment, the textile fabric 200 is combined with a barrier layer 201 and embossed with a coarser and deeper "macro pattern", creating new raised areas of fabric 250 and lowered areas of fabric 252. The new elevated areas and depressed areas define a three-dimensional surface. In one embodiment, the textile fabric and barrier layer are combined and subsequently embossed. A heated embossing tool (not shown) with projections deeper than the original thickness of the textile fabric and arranged with a spacing wider than the spacing between elevated areas of yarns and depressed areas of yarns presses the textile fabric and barrier layer into a soft and resilient back-up plate or roll 299, for example, silicon rubber. The silicon rubber surface conforms, withstands high temperatures and releases any resin that penetrates through at the highly deformed lowered areas. As a result of the deep embossing the depth of the embossed fabric exceeds the thickness of the original fabric. The barrier layer is usually maintained in the raised areas, which have been subjected to negligible deformation, and compromised in the lowered areas, which have been highly deformed by the projections of the embossing tool.

A plurality of particles ranging in size from smaller than the gap widths on the top surface of the yarns to larger than the gap widths on the top surface of the yarns are applied to the top surface of the textile fabric. These different size particles can be applied separately or simultaneously. Suitable methods for applying the particles include sifting. In one embodiment, particles 218, which are smaller than the gaps among the filaments or fibers within the yarns penetrate the yarns. Particles 219 that are larger tend to descend down into the bottom of the lowered areas of the textile fabric by simple gravity. The larger particles, as well as any smaller particles that may be located at the elevated areas may be aided to move into the compromised lowered areas by applying vacuum under the fabric, vibrating the fabric, blowing air onto the fabric, or any combination of these techniques, applied separately or simultaneously. When the accumulated particles in the lowered areas melt, the melted particle resin fills and seals openings created in the barrier by embossing. In one embodiment, the melted particle resin in the lowered areas protrudes locally over the fibers or filaments of the yarns without affecting surface tactility in the textile fabric as the melted particle resin remains below the yarn surface in the raised areas.

In one embodiment, at least parts of the fibers or filaments in the raised areas are exposed and are free of melted particle resin after heat is applied to melt the particles. As heat applied toward the top surface melts the smaller particles, allowing the molten particles 220 to flow into the yarns, the top surface of the textile fabric and the cut edges are stabilized while retaining the fibrous feel of the top surface. The melting temperatures of the smaller particles and larger particles may be the same or different, and heat may be applied to melt both simultaneously or separately. In addition, heat may be applied to melt the particles gradually.

In other embodiments, the textile fabric illustrated in FIG. 5 is any fabric, woven, knit, stitchbonded or nonwoven, built with or without yarns, using filaments or staple fibers. In other embodiments, the textile fabric includes pre-shaped micro patterns exhibiting elevated and depressed areas. In one embodiment, the textile fabric is initially flat without any elevated or depressed areas of yarns. In one embodiment, the textile fabric is pre-treated with repellent solutions. In one embodiment, the textile fabric is treated with solutions containing particles of a smaller size than the openings among surface fibers or filaments. If the textile fabric is embossed with a barrier attached to the bottom surface, particles applied to the top surface that remain above the yarns, fibers or filaments at the elevated areas of yarns or raised areas of the textile fabric can be directed to the depressed areas of yarns or lowered areas of the textile fabric where the barrier may be compromised by the embossing action to restore the barrier and to stabilize the fabric.

Figure 6:
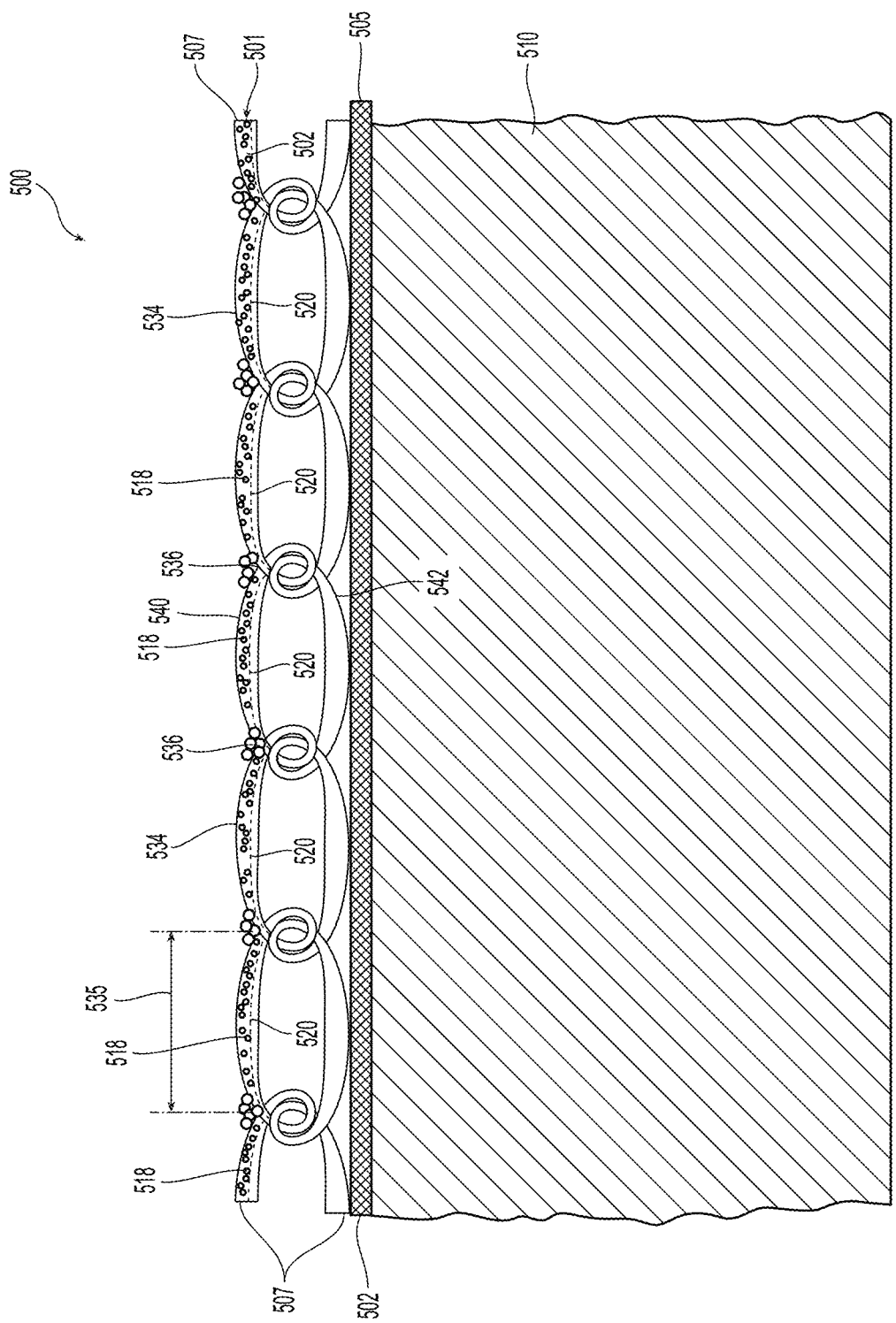
FIG. 6 is a schematic representation of a side view of an embodiment of a textile fabric integrated into a composite and containing an arrangement of a plurality of particles.
Figure 7:
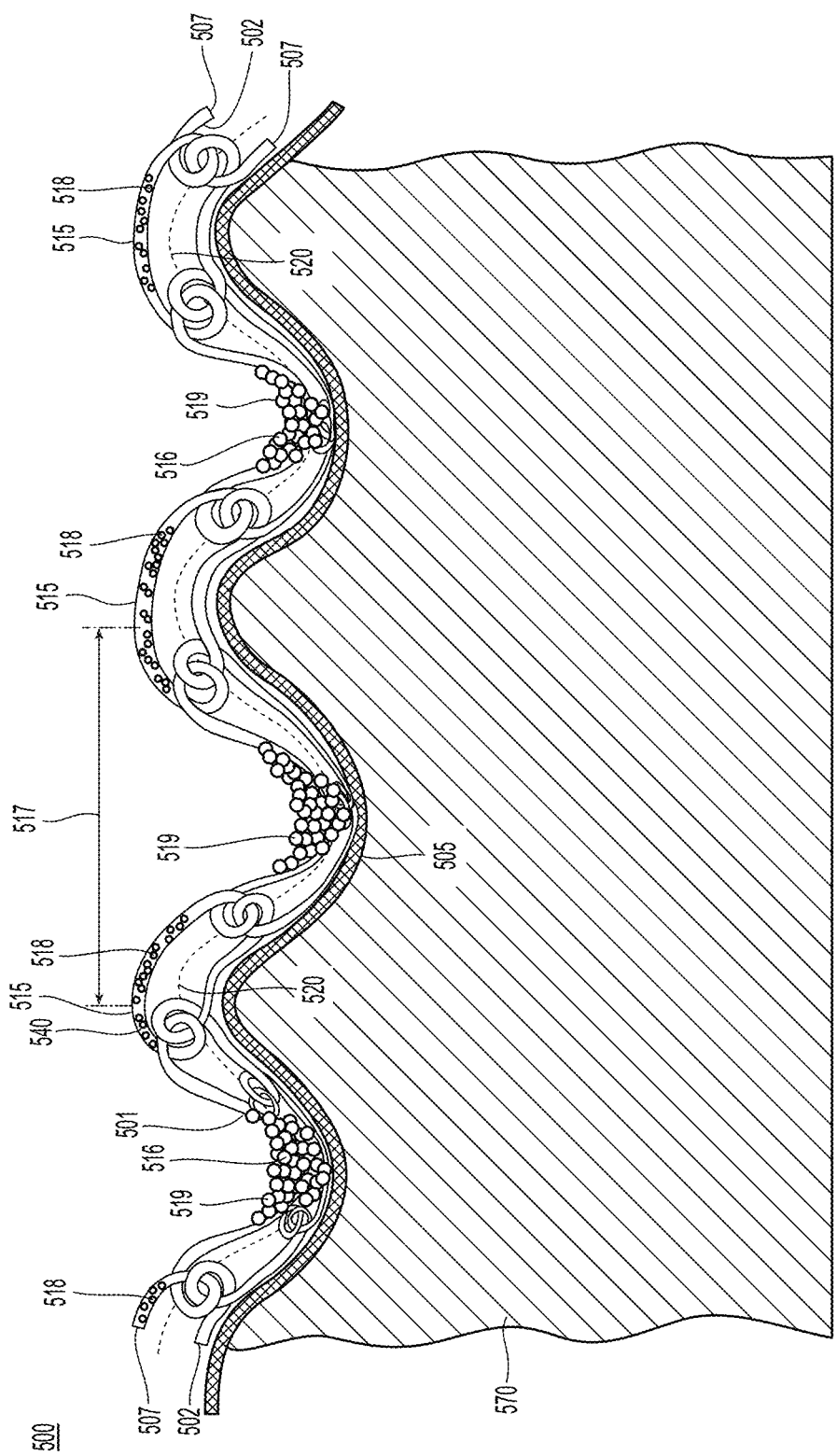
FIG. 7 is the schematic representation of a side view of an embodiment of a textile fabric integrated into a composite, embossed with a macro pattern and containing an arrangement of a plurality of particles.

Referring to FIGS. 6 and 7, in one embodiment, a textile fabric 501 is incorporated into a composite 500. As shown in FIG. 6, the textile fabric 501 is placed over or pre-attached to a barrier layer 505 followed by placement over a cushioning layer 510. The cushioning layer eliminates the need for the soft silicon rubber that is used to form the embossed fabric of FIG. 5 and is attached permanently to the barrier and the fabric after being embossed with heat as shown in FIG. 7. As shown in FIG. 6, the textile fabric, in a similar manner to the fabric of FIG. 4, includes a plurality of yarns 502 looping in and out of the top surface 540 and the bottom surface 542 of the textile fabric forming the textured surface pattern of elevated areas of yarns 534 and depressed areas yarns 536 with a given repeating interval 535. When cut to size, the textile fabric in the composite includes cut edges 507.

As in the sequence described in relation to FIGS. 4 and 5, a plurality of low-melting particles is deposited onto the textile fabric in the composite of FIG. 6, for example, by sifting. The particles can be added in a single application or in multiple applications. In one embodiment, at least some of the particles penetrate the gaps between the yarns or filaments. Subsequently applied heat melts the particles 520 that migrate into the yarns and into the depressed areas of the yarns of the fabric, away from the top surface, stabilizing the surface without losing the textile feel of the surface.

Referring to FIG. 7, with or without the pre-application of particles to the face fabric, and with or without preheating the face fabric to melt such particles, if any, the layers of FIG. 6 are embossed with a macro pattern and laminated with heat, integrating the three layers and producing the composite 500 illustrated in FIG. 7. The macro pattern creates raised areas 515 and lowered areas 516 repeating with a given spacing 517. The particles and resin deposited onto the elevated areas and the melted particle resin that migrates into the textile fabric, if any, stabilize the top surface and the cut edges of the composite. The barrier layer is subject to compromise at the bottom of the lowered areas where the projections of the embossing tool force the fibers and the barrier layer open.

The barrier layer is usually maintained in the embossed raised areas but may be compromised in the embossed lowered areas. A plurality of low-melting particles is introduced onto the top surface 540 of the fabric layer in one or more applications, in a manner as depicted, for example, in FIG. 5. The particles in the plurality of particles can all be the same size or can have a plurality of different sizes. As was discussed above with regards to FIG. 5, the particles in the lowered areas tend to descend into the lowered areas and accumulate near the compromised barrier bottom by simple gravity as these particles do not enter the smaller gaps between the fibers or filament within the raised areas. Vibration or blown air, preferably combined with vacuum applied underneath through the backing layer in cases wherein the backing layer is air-permeable, is used to promote the concentration of particles at the lowered areas and to minimize or eliminate particles within the raised areas. After subsequent heat treatment, the compromised barrier at the bottom of the lowered areas is restored, and some degree of extra stability is added to the entire surface with limited frequency of melted particles on the surface.

The process used in FIGS. 6 and 7 can be applied to any surface fabric attached to a barrier layer. The surface fabric may be formed with individual fibers or filaments instead of yarns, may be initially flat and non-textured and may or may not be pre-treated with fine particles entering between surface filaments or fibers. After embossing with a deep pattern, particles coarser or finer than the gap widths among the surface fibers or filaments that remain on the top surface at the raised areas of the textile fabric are directed to the lowered areas with vacuum, blown air, vibration, sweeping by brushing or combinations of these techniques. This relieves the raised areas of fabric from unnecessary surface resin while reinforcing the barrier within the depressed areas.

Figure 8:
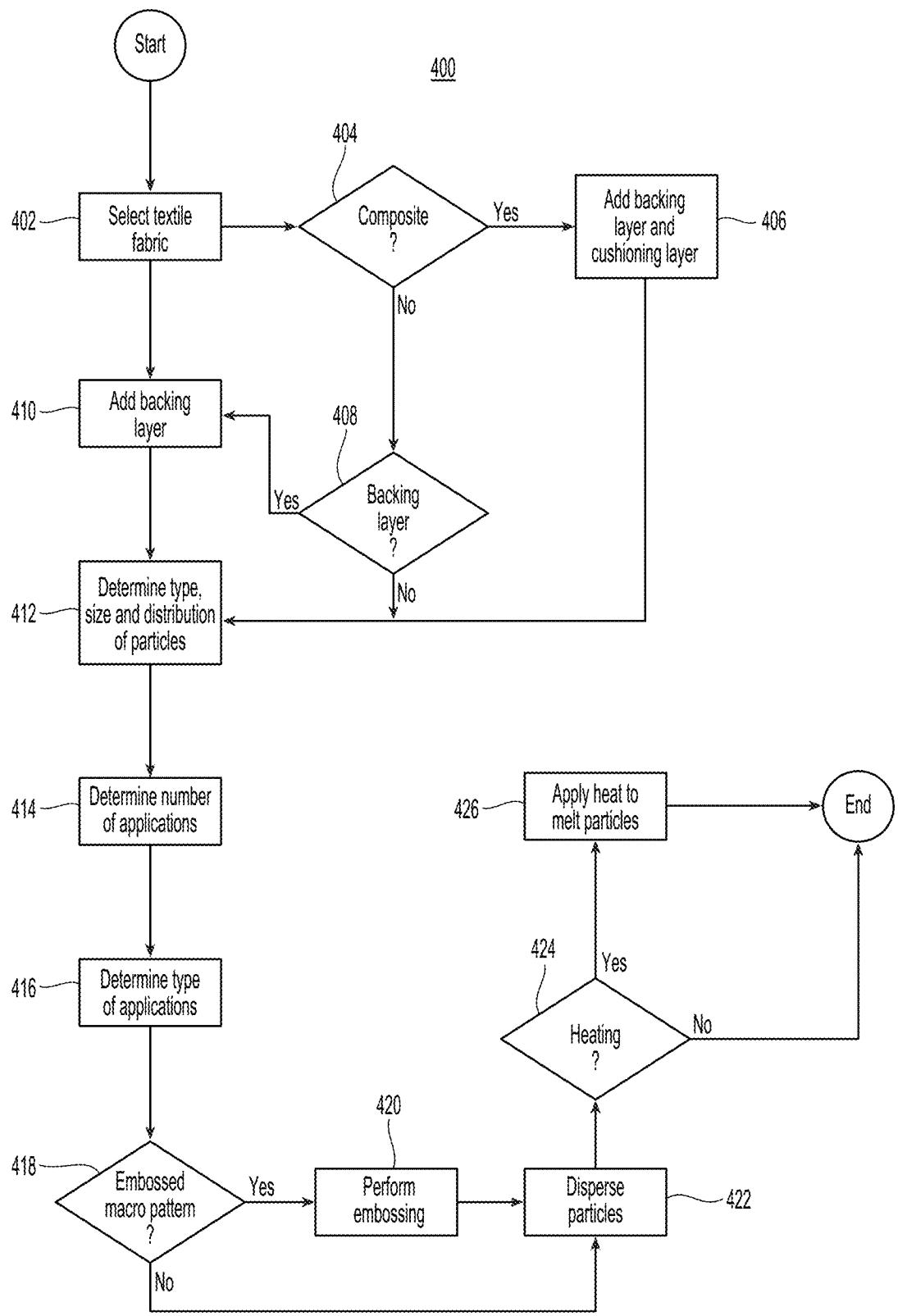
FIG. 8 is a flow chart illustrating an embodiment of a method for making a textile fabric having an increase in surface and cut edge durability.

Referring now to FIG. 8, exemplary embodiments are directed to a method for improving surface and edge durability and resistance to fluid penetration in a textile fabric 400. Initially, the desired textile fabric is selected 402. Suitable textile fabrics include, but are not limited to knit fabrics, woven fabrics, tufted fabrics, nonwoven fabrics and stitchbonded fabrics. The textile fabric is formed from a plurality of yarns or filaments or staple fibers and contains a plurality of gaps disposed among the filaments or fibers. The yarns, filaments or fibers have a yarn melting point. In one embodiment, the yarns filament or fibers form a textured surface pattern with elevated areas of yarns and depressed areas of yarns. The gaps define a plurality of gap widths A determination is then made regarding whether the textile fabric is to be combined with a barrier layer to form a composite 404. If the textile fabric is to be incorporated into a composite, for example, with barrier properties, the additional barrier layer is added to the textile fabric 406. If the textile fabric is not to be combined with a barrier layer, a determination is made regarding whether the textile fabric is to be combined with a backing layer 408, for example, a cushioning layer. If the textile fabric is to be combined with the backing layer, the backing layer is added and attached to the textile fabric 410.

A determination is then made regarding the type and composition of the particles to be added, the size or sizes of the particles to be added, the melting temperature of each type of particle, the melt viscosity or melt index of each type of particle, and the distribution pattern of the particles to be attained across the top surface of the textile fabric 412. In one embodiment, the particles for the plurality of particles are selected having a particle size less than a first gap width or a second gap width to disperse particles in at least one of the openings between filaments and the spacings between yarns. Having identified the particles to be applied, a determination is then made regarding the number of applications 414 and the type of applications 416. Suitable types of applications include sifting and applying in a liquid suspension.

A determination is then made regarding whether the textile fabric or composite is to be embossed with a macro pattern 418. If the pattern is to be embossed, the textile fabric or composite is embossed with a macro pattern containing raised areas and lowered areas 420.

Following embossing with the macro pattern or if the textile fabric is not to be embossed, the selected plurality of particles is dispersed on the textile fabric 422. The particles are dispersed in accordance with the type of particles selected, the type of application, the number of applications and the desired distribution of particles. In one embodiment, at least one of dry sweeping or brushing, vacuum, vibration, or blown air is applied to the textile fabric to direct particles that fail to enter the gaps between the surface filaments or fibers at the raised areas into the lowered areas. In one embodiment, the plurality of particles includes particles having a size smaller than at least one gap width in the plurality of gap widths and a particle melting point temperature lower than the yarn melting point. In one embodiment, dispersing the plurality of particles comprises sifting the plurality of particles onto a top surface of the textile fabric. In one embodiment, dispersing the plurality of particles includes incorporating the plurality of particles into a liquid suspension, applying the liquid suspension to a top surface of the textile fabric and evaporating a liquid from the liquid suspension after applying the liquid suspension to the top surface, and optionally wiping the surface with a wet or dry tool to cause the particles to proceed between the surface fibers or filaments and away from the surface.

After the particles are dispersed on the textile fabric and directed to the desired locations, a determination is made regarding how heat is going to be applied to melt the particles and to disperse the resulting melted particle resin through the textile fabric and yarns 424. Sufficient heat is applied to the textile fabric to melt particles 426 within the plurality of particles dispersed within the yarns. In one embodiment, applying heat to the textile fabric includes using at least one of radiant heating, convection and conduction on a top surface of the textile fabric.

Figure 9:
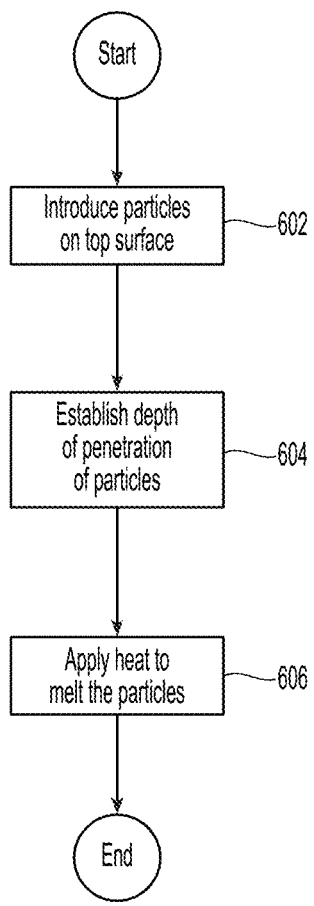
FIG. 9 is a flow chart illustrating another embodiment of a method for making a textile fabric having an increase in surface and cut edge durability.

Referring to FIG. 9, exemplary embodiments are also directed to a method for making a fabric having increased resistance to one or more of surface wear, edge fraying or fluid penetration. A plurality of low-melting particles is introduced onto a top surface of a textile fabric 602. The top surface includes a plurality of surface fibers and gaps among the plurality the plurality of surface fibers. In one embodiment, the elevated areas and depressed areas define a three-dimensional surface. In one embodiment, the surface fibers are yarns, and the elevated and depressed yarns are defined by the looping of the yarns emerging from and returning into the fabric face. In one embodiment the textile fabric is generally flat, and the surface texture is formed exclusively with yarn loops.

In one embodiment, the plurality of low-melting particles is introduced onto the top surface includes sifting the plurality of particles into the top surface of the fabric, for example as a dry powder. In another embodiment, the plurality of low-melting particles is incorporated into a liquid suspension, e.g., water with or with a surfactant. The liquid suspension is applied to the top surface of the fabric. In one embodiment, the liquid suspension is applied only to the elevated areas of the top surface. In one embodiment, the method includes an evaporative heating step to evaporate the liquid from the liquid suspension following application of the liquid suspension to the top surface and before applying heat sufficient to melt the plurality of particles.

In one embodiment, the plurality of low-melting particles descends disproportionately on the depressed areas rather than the elevated areas when introducing the plurality of low-melting particles onto the top surface. In one embodiment, the particles or powder has a particle size greater than a size of the gaps among the plurality of surface fibers in the elevated areas. In addition, a majority of the plurality of particles are located in the depressed areas. In one embodiment, the plurality of particles includes larger particles and smaller particles. The smaller particles pass into the gaps among the surface fibers, and the larger particles collect in the depressed areas. In one embodiment, the plurality of particles or powder is sifted to separate larger particles from the smaller particles.

A desired planar pattern of particle distribution and depth of penetration from the top surface of the plurality of low-melt particles into the gaps is established 604. In one embodiment, the textile fabric includes upper strata, and establishing the desired depth of penetration is established such that a majority of the plurality of particles or powder are located within the upper strata. In one embodiment, a vacuum is applied to a bottom surface of the fabric opposite the top surface to control the planar distribution of the plurality of particles and the depth of penetration of the plurality of particles into the fabric. In one embodiment, vacuum is applied to the bottom surface while introducing the plurality of low-melting particles onto the top surface. In one embodiment, the fabric is vibrated to control the planar distribution and depth of penetration of the plurality of particles either with or without the simultaneous application of vacuum.

Heat is then applied to the top surface to melt the plurality of particles or powder 606. The method of applying the heat, the conditions during heating, e.g., vacuum and vibration, the type of particles, the embossed pattern on the fabric, can affect the location and flow of the molten resin during heating. In one embodiment, at least a portion of the plurality of surface fibers are free of melted particle resin. The portion of the plurality of surface fibers free of melted particle resin is located in the elevated areas of the flat fabric or the raised areas of the embossed pattern of the fabric either alone or as part of a composite.

In one embodiment, application of heat to melt the plurality of particles improves at least one of overall durability, fluid penetration resistance and cut-edge fraying resistance of the fabric. Suitable methods for applying heat include, but are not limited to, using radiation, hot air or a heated surface in light contact with the elevated areas of the top surface. In one embodiment. vacuum is applied to a bottom surface of the fabric opposite the top surface while applying heat to the top surface to melt the plurality of particles.

In one embodiment, the textile fabric is incorporated into a composite and the particles and heating applied to the composite. In one embodiment, a water-repellent coating is applied to the textile fabric. In one embodiment, the water-repellent coating is applied before introducing the plurality of low-melting particles onto the top surface. In another embodiment, the water-repellent coating is applied after introducing the plurality of low-melting particles onto the top surface. In addition to a single application of particles onto the top surface of the textile fabric, two or more applications of particles or powders can be used. For example, a first application can be made with a first size or coarseness of particles and a second application with a second size or coarseness of particles. In one embodiment, two applications are made using the same size or coarseness of particles. In one embodiment, a first application of particles is made to the textile fabric, and a second application of particles are made following embossing of the textile fabric containing the first application of particles.

In one embodiment, a barrier layer is located within the lower strata of the fabric or attached to a bottom surface of the fabric opposite the top surface. The fabric is embossed to create embossed raised areas and embossed lowered areas. The barrier layer is maintained in the embossed raised areas and compromised in the embossed lowered areas. Therefore, the textile fabric itself and the embossed pattern can each include raised areas and lowered areas. A plurality of low-melting particles is introduced onto the embossed lowered areas. This can be the first or second application of particles. If it is the second application of particles, the first application of particles is made to the textile fabric or composite containing the textile fabric prior to embossing. Heat is applied to the top surface to melt the plurality of particles and restore the barrier layer in the embossed lowered areas.

In one embodiment, a barrier layer is located within the lower strata of the textile fabric or attached to the bottom surface of the textile fabric opposite the top surface, and additionally the textile fabric containing the barrier layer is incorporated into an upper surface of a composite. The composite is embossed to create the embossed raised areas and embossed lowered areas. The barrier layer is maintained in the embossed raised areas and compromised in the embossed lowered areas. A plurality of low-melting particles is introduced onto the embossed lowered areas. This can be the first or second application of particles. If it is the second application of particles, the first application of particles was made to the textile fabric or composite containing the textile fabric prior to embossing. Heat is applied to the top surface to melt the plurality of particles and to restore the barrier layer in the embossed lowered areas.

Embodiments involving the use of dissolved polymers applied to the surface or to the entire fabric and subsequently driven down into the fabric layers under the surface before applying heat can take advantage of many of the secondary treatments available to the embodiments involving powder application. These embodiments include the addition of active non-dissolving particles that are mixed with the dissolved polymer in powder form, barrier layers introduced under the textile fabric or within a composite topped by the textile fabric, fine and smooth needling applied to adjust the fluid blocking properties after solvent flash-off and curing, and multiple applications of the same polymeric solution or different polymeric solutions with or without intermediate surface treatment involving extra solvent, and with or without intermediate heat setting.

In one embodiment, a polymer solution with a relatively high viscosity is first applied to the textile fabric and forced into the lower strata of the fabric. The solvent is then evaporated, creating a relatively porous internal sublayer. In one embodiment, the polymer solution is heat-treated at this stage. Alternatively, the polymer solution is left in place. A second application of a less viscous polymeric solution seals the first sublayer partially or totally, creating a submerged fluid or gas barrier that can be engineered for special effects such as fluid blockage with or without vapor permeability. The viscosities of each application may be adjusted by adjusting the ratio of polymer to solvent and can be tailored to the particular type of textile fabric In one embodiment, the chemical composition of the suspended adhesive particles or the chemical composition of the dissolved polymers is compatible with the fibers or yarns in the fabric. Chemical composition compatibility facilitates the formation of chemical bonds in addition to mechanical bonds by simply surrounding the fibers, yarns or fiber bundles of yarns. In one embodiment, the particles or dissolved polymers are either partially or totally incompatible in chemical composition with the fibers or yarns, but still convenient to form bonded layers using heavier weights at a more conveniently lower cost, as in the case of ground recycled textiles.

In one embodiment, the suspended particles or polymeric solution is applied to the fabric using two or more discrete applications. Multiple applications are used to achieve a desired balance of bulk, durability, edge stability, and planar stiffness in the fabric. In one embodiment, the type particles, the chemical compatibility of the of the particles, the use of additional fluid or solvent, and the form of the particles, i.e., suspension versus solution, are varied from application to application. For example, a first application utilizes polymers that are incompatible with some or all of the fibers in the fabric. The first application is followed by the application of additional fluid to drive the polymer under the surface of the fabric. A second application is then made with a polymer that is chemically compatible with the fibers. The second application is also followed by the application of additional fluid to drive the polymer under the surface of the fabric. The resulting fabric has a lower strata stabilized with mechanical bonds and an upper strata under the surface stabilized with both mechanical and chemical bonds.

EXAMPLES

In a first example, a textile fabric as illustrated in FIG. 4 was selected and included a plurality of yarns forming a flat structure having a textured surface pattern with a given repeating interval. The surface pattern included a plurality of protruding elevated yarn areas and a plurality of depressed yarn areas. The yarns were bulked with gaps open between the filaments in the yarns. The surface gaps varied up to approximately 0.004 inches or 100 microns. The textile fabric had a weight of 12 oz./sq. yd. (420 grams/sq. m) and a thickness of 0.09 inches (2.25 mm). The textile fabric was treated with a water repellent treatment.

Low melt polyester particles with a nominal particle diameter of 82 microns were sifted onto the top surface 109 of the textile fabric at a weight totaling approximately 1.0 oz. per sq. yd. The particles landed on the elevated yarn areas with some direct penetration between the surface fibers. Radiant heat was applied on the top surface to melt the applied particles throughout the fabric. Surface abrasion resistance and cut-edge fraying or fuzzing resistance improved dramatically. The elevated yarn areas remained fibrous. The top surface remained soft and textile like. Air and water vapor permeability were not noticeably affected. Liquid penetration resistance improved, and spills remained on the top surface for periods varying between several minutes and several hours In a second example using the same textile fabric as in FIG. 4, the 82 micron particles were dispersed in water containing a surfactant. The dispersion was applied gently over the top surface of the fabric, touching only the elevated areas. The particles penetrated between filaments. The fabric was dried, and the particles were activated with heat. Particle pick-up was approximately 0.6 oz./sq. yd. The thickness of the fabric did not change. The surface stability and cut edge fraying resistance were satisfactory and equivalent to the textile fabric as in the first example in which dry particles were applied using sifting. Air and water vapor permeability and resistance to spills were not noticeably different from the textile fabric without the dispersed particles.

In a third example, coarse particles having a particle size varying between approximately 400 and 700 microns were sifted over the top surface of the textile fabric to add approximately 0.35 oz./sq. yd. of weight. The particles were chosen to have a high melt index in order to flow freely when heated and molten without requiring significant pressure. Particles landed essentially equally onto the elevated areas and the depressed areas. The resin in the particles was activated by lightly touching the surface with a "non-stick" hot iron. Sufficient melted particle resin was found to be present on the elevated areas to resist fraying or fuzzing at the cut edges. The melted particle resin in the depressed areas of yarns also melted due to radiation from the heated iron; however, that melted particle resin remained in place without substantial penetration. The thickness of the fabric remained at the original 0.090 inches. Resistance to air, water vapor or spilled liquids remained the same as textile fabric without particles.

In a fourth example, the textile fabric was subjected to vacuum applied to a bottom surface opposite the top surface of the fabric. The vacuum was applied as fine 82 micron particles were sifted onto the top surface. The distribution of particles or powder shifted toward the elevated areas, allowing air to pass through more freely as compared to the denser depressed areas. No significant effect on liquid penetration resistance was observed until added particle or powder weight was increased to approximately 2.6 oz./sq. yd. (86 gm/sq. m). Following activation of the applied particles or powder with radiant heat, surface stability and edge fraying resistance improved further, while considerable textile feel on the surface remained. Liquid penetration resistance increased, with the textile fabric passing the 24 hr British Spill Test. However, water collected on the surface could still be forced-in by rubbing or by applying a pressure of approximately 20 psi to simulate the pressure of stepping onto collected puddles.

In a fifth example, the face or top surface of the textile fabric of FIG. 4 was converted to a liquid blocking layer by adding a second separate application of fine particles applied as a fine sifted powder. The fabric in the embodiment of the fourth example described above was subjected to a second sifting of fine 82 micron particles or powder with simultaneous vacuum and planar vibration during the second powder deposition. In addition, vacuum was applied to the bottom face of the fabric as the fabric was being subjected to heat. The 1.0 oz./sq. yd. of particles or powder applied during the second deposition by sifting brought the fabric weight up to 15.6 oz./sq. yd. After activation of the second application of particles or powder with radiant heat, the cut edges were highly stabilized. Air and water penetration resistance increased dramatically. Soapy water failed to penetrate the surface when puddles are brushed, rubbed or pressed. The surface maintained a semi fibrous fabric feel, with sporadic yarn/filament sections protruding beyond molten polymer.

In a sixth example, the textile fabric of FIG. 4 was placed over a solid low-melt barrier layer supported by a silicon rubber sheet, as shown in FIG. 5. Pressure and heat were applied with a three-dimensional tool from the top surface of the fabric. The result was the three-dimensional textile fabric illustrated in FIG. 5. The resulting deep embossed macro pattern included deeper and coarser raised areas and lowered areas that repeated with a given spacing. The low melt resin backing layer melted at the compacted lowered areas and penetrated into the textile fabric, developing local barrier failure. Approximately 0.5 oz./sq. yd. of coarse 400-700 micron particles or powder with a very high melt index were then sifted onto the embossed surface and radiant heat was applied to the surface to melt the deposited particles. The effect of melted particle resin on the surface yarns within the raised areas was similar to that within the elevated areas in the fabric above before embossing, with melted particle resin intermittent along the surface yarns at the raised areas. The barrier layer still developed leaks at the lowest parts of the lowered areas, which caused the fabric to lose effectiveness as a barrier to liquids. However, the surface yarns at the cut edges were stabilized and resistant to fraying, while the surface maintained a fibrous feel, with surface filament segments within raised areas free of resin.

In a seventh example spill resistance was restored to the pre-embossed three-dimensional textile fabric of the sixth example using a second application of coarse 400-700 micron high-melt-index polyethylene powder or particles in addition to the first application performed on the textile fabric. The second application of particles was performed by sifting with vacuum simultaneously applied to the bottom surface to add 2.0 oz./sq. yd., bringing the total weight to 14.5 oz./sq. yd. The particles or powder guided by the preferential movement of air into the compromised lowered areas visibly landed primarily in the lowered areas. Radiant heat was applied from the top surface with simultaneous vacuum applied to the bottom surface of the textile fabric. The sample passed the British spill test. The cut edges remained resistant to fraying. Portions of the fibers in the yarns within the raised areas remained free of adhesive, maintaining a fibrous feel. The melted particle resin did protrude over fibers at the bottom of the lowered areas but remained below the level of the fibers in the raised areas.

In an eighth example, the textile fabric was simultaneously embossed, stabilized and laminated onto the backing layer. The textile layer was placed over a low melting barrier layer and a cushioning layer. Coarse 400-700 micron low-melt particles or powder were sifted onto the top surface 412, adding a weight of approximately 0.7 oz./sq. yd. The composite was embossed and laminated with heat, integrating the three layers or elements and producing the composite, for example as illustrated in FIG. 7. Due to the presence of resin deposited onto the raised areas, the top surface and the cut edges of the composite were stabilized and resisted fraying and fuzzing. The barrier created by the low-melt layer was also maintained within the raised areas of the embossed pattern of the composite, as the yarns locally shielded the low-melt layer. The textile fabric and the entire composite still exhibited permeability to fluids due to leakage within the compromised lowered areas of the embossed pattern.

In a ninth example, fluid penetration resistance was restored to the embossed composite of the eighth example. A mixture of high melt index 50/50 coarse and fine powders or particles was sifted upon the composite as vacuum was applied to the bottom surface. The majority of the particles or powder landed in the lowered areas. A small percentage of the finer powder landed in the raised areas, caught by the interstices between the yarn filaments. The resulting composite was heated with radiant heat with vacuum continuing to be applied to the bottom surface to melt all powders. Adding approximately 1.6 oz. of particles or powder was sufficient to fill the perforations in the low-melt barrier layer within the lowered areas 504 and to restore the composite so that it passed the British spill test. Raising the added weight to 3.5 oz. sealed the upper surface totally, with the raised areas still partially fibrous and resistant to fraying at the cut edges.

Exemplary embodiments are directed to methods for making improved textile fabrics by introducing into the textile fabrics low-melting polymeric solutions or liquid dispersions or suspensions of polymeric particles or powders. Suitable solvents for the polymeric solutions include, but are not limited to, organic solvents such as volatile organic compounds, for example, short-chain alcohols including methanol, ethanol, n-propanol, isopropanol and butanol, ketones, for example, acetone methyl-ethyl ketone, and other volatile solvents, for example, toluene, xylene hexane, THF (tetrahydrofurane), DMF (dimethylformamide) and DMSO (dimethylsulfoxide). The volatile organic compounds can be flashed-off from the textile fabrics using one or more of vacuum and heat. Suitable organic solvents also include long-chain organics, for example, oils, alcohols, naptha, and petroleum distillates. Long-chain organic solvents dissolve selected polymers but may be difficult to remove from the textile fabric, which could contribute to soiling. In one embodiment, the solvent is THF. Suitable polymers that are soluble in THF include common thermoplastic polymers, for example, polyesters, polystyrenes, polyurethanes, polycarbonates, Nylon-6 and polyvinyl alcohols. The THF can be flashed off after application to the surface of the textile fabric.

Water, in combination with surfactants, e.g., soaps, ethoxylated propylene glycol or lecithin, in very low percentages by weight is suitable to hold particulate or powdered low-melt adhesives in a liquid suspension.

In one embodiment, the textile fabrics have three-dimensional surfaces. In one embodiment, the textile fabrics are incorporated into composites containing the textile fabrics on their surfaces. The composites contain one or more additional layers such as barrier layers and backing layers. In one embodiment, the barrier layer or backing layer is laminated to the textile fabric using a relatively flat heated tool resulting in a composite with a flat face or with the general pattern of the texture originally present in the textile fabric. Alternatively, lamination of a textile fabric to a backing layer or barrier layer is achieved using a three-dimensional heated tool. The three-dimensional heated tool forms a deeper and coarser face texture with a depth exceeding the original thickness of the textile fabric.

In one embodiment, the textile fabric is a nonwoven layer formed with filaments or staple fibers. In one embodiment, the textile fabric is attached to a cushion layer. In one embodiment the fabric is attached to a barrier layer.

In one embodiment, a suspension of polymeric particles is created by introducing the polymeric materials into a liquid. Suitable polymeric particles include, but are not limited to, low melting polyester, polyethylene, and acrylics. Suitable liquids include, but are not limited to, water and water aided by surfactants. In one embodiment, suitable suspended polymeric particles or polymeric powders include, but are not limited to, fine polymeric powders commercially used in processes, for example, the bonding of non-wovens and coarser powders produced by grinding low melt polymers including polymers contained in recycled fabrics or floorcoverings. These powders contain particles having a range of particle sizes suitable for use with the textile fabrics. Alternatively, a polymeric solution is created by dissolving at least one polymer into a solvent.

In one embodiment, one or more repellents are added before or after the application and curing of polymeric particles or polymeric solution. Suitable repellents include but are not limited to acrylic copolymers with PFOA (perfluorooctanic acid), acrylic polymers with stearic acid or other hydrophobic functional groups, and other soil and stain resistant polymers and finishes such as perfluorocarbons.

In one embodiment, high-melting or non-melting fine elements are mixed with the suspension of polymeric particles or polymeric solution to obtain special effects. These fine elements and desired effects include colored particles for aesthetic purposes, hard particles to increase resistance to abrasion and particles reacting to moisture or heat to produce special visual or functional effects, including but not limited to breathability, moisture absorbency and moisture repellency at the surface.

In one embodiment, the polymeric solutions or suspensions of polymeric particles are introduced into the top surface of the textile fabric or to the entire textile fabric. Suitable processes for applying the polymeric solutions or suspensions of polymeric particles include, but are not limited to, spraying, immersion and squeezing, and wet transfer coating. Immersion and squeezing is commonly referred to as padding. Each process for applying polymeric solutions or suspensions of polymeric particles can followed with the application of additional suspension liquid or solvent or solvent to reduce or to eliminate the added adhesive polymer from the surface before the application of heat.

In one embodiment, the textile fabric and top surface of the textile fabric are flat. Alternatively, the textile fabric is embossed with a three-dimensional pattern that creates elevated areas and depressed areas in the textile fabric. In one embodiment, the three-dimensional texture or pattern is achieved by embossing the textile fabric with a heated tool having a pattern of projections that create the elevated areas and depressed areas. In one embodiment, the fabric is formed by yarns that loop into and out of the top surface. The looping yarns create the surface texture of elevated areas and depressed areas. In one embodiment, the slightly textured surface containing the looping yarns is deeply textured by embossing with the coarse three-dimensional pattern. In one embodiment, the elevated areas and depressed areas of the embossed textile fabric define a depth between the top of the elevated areas and bottom of the depressed areas greater than the original thickness of the textile fabric.

The polymeric solutions or suspensions of polymeric particles can be applied to both the elevated areas and depressed areas or selectively to the elevated areas. In one embodiment, the polymeric solutions or suspensions of polymeric particles are applied to the elevated areas, for example, using a fine spray or by making wet contact with a wet roller or brush, so that the polymeric solutions or suspensions of polymeric particles do not proceed into the depressed areas.

In one embodiment, an additional volume of the liquid in which the particles are dispersed or dissolved, i.e., the solvent, is applied to the top surface of the textile fabric following introduction of the polymeric solutions or suspensions onto the top surface. Suitable methods for applying the addition volume of liquid or solvent include, but are not limited to, wiping the surface with the additional volume of liquid or solvent, spraying the additional volume of liquid or solvent onto the surface and brushing the surface with the additional volume of liquid or solvent. The additional volume of liquid or solvent is sufficient to move or migrate at least a portion of the suspended particles or dissolved polymer away from and below the top fibrous surface of the textile fabric. In one embodiment, the additional volume of liquid or solvent is sufficient to move or migrate all suspended particles or dissolved polymer away from and below the top fibrous face. In on embodiment, additional volume of liquid or solvent is sufficient to move the suspended particles or dissolved polymer to a controlled depth below the top surface. The result of moving the suspended particles or dissolved polymer away from the top surface is fibers on the top surface protruding above the polymer. The protruding or exposed fibers prevent excessive hardening of the top surface of the textile fabric, preserving the textile look and feel of the textile fabric.

In one embodiment, one or more repellents are added to the additional volume of liquid or solvent. In one embodiment, high-melting or non-melting fine elements are mixed with the additional volume of liquid or solvents to obtain special effects as discussed above.

In one embodiment, the deposited polymer solution or suspended particles are activated with heat to melt and set the polymer in situ. In one embodiment, any added repellents are cured as the polymers applied to the textile fabric are activated and set. Heat is applied to at least a portion of the textile fabric. Preferably, heat is applied to the entire textile fabric. Suitable heat sources include, but are not limited to, radiant heat, hot air, and a heated contact surface. In one embodiment, the heated contact surface is applied to the textile fabric using low pressure. In one embodiment. vacuum is applied to a bottom surface of the fabric opposite the top surface while applying heat to the top surface.

In one embodiment, activation of the deposited particles or polymer is achieved by raising the temperature of the entire textile fabric to a level sufficient to melt the polymer or polymer particles. In one embodiment, the polymer or polymer particles are activated when the textile fabric is embossed with the three-dimensional pattern using a heated tool equipped with surface projections. In one embodiment the polymer or polymer particles are activated when the textile fabric is laminated to additional layers, for example, a barrier layer or a backing layer. In one embodiment, a soft and resilient back-up tool, for example a silicon rubber back-up tool, is used to emboss the textile fabric with a depth exceeding the original thickness of the textile fabric. Alternatively, the textile fabric is embossed against a conformable cushioning backing, eliminating the need for a soft back-up tool as the textile fabric forms into the backing.

In one embodiment, a water-repellent is incorporated into the textile fabric. In one embodiment, a water-repellent coating is applied to the textile fabric and cured before the suspension of polymeric particles or polymeric solution is introduced into the fabric. Alternatively, the water-repellent coating is applied after the suspension of polymeric particles or polymeric solution is introduced and cured with heat The advantages and improvements associated with the textile fabric containing the activated polymer applied as a suspension of polymeric particles or as a polymeric solution vary depending upon the structure of the top surface of the fabric, the nature of the surface fibers or yarns, the amount of deposited particles, the melt characteristics of the particles, and the structure of the deposited particles. These advantages and improvements include, but are not limited to, simple stabilization of the elevated areas of yarns and raised areas of fabric versus wear and abrasion, achieving a breathable fluid barrier with minimum hardening of the textile fabric surface, and blocking of fluid penetration through the textile fabric without excessive hardening and without eliminating the fibrous feel of the top surface.

Figure 10:
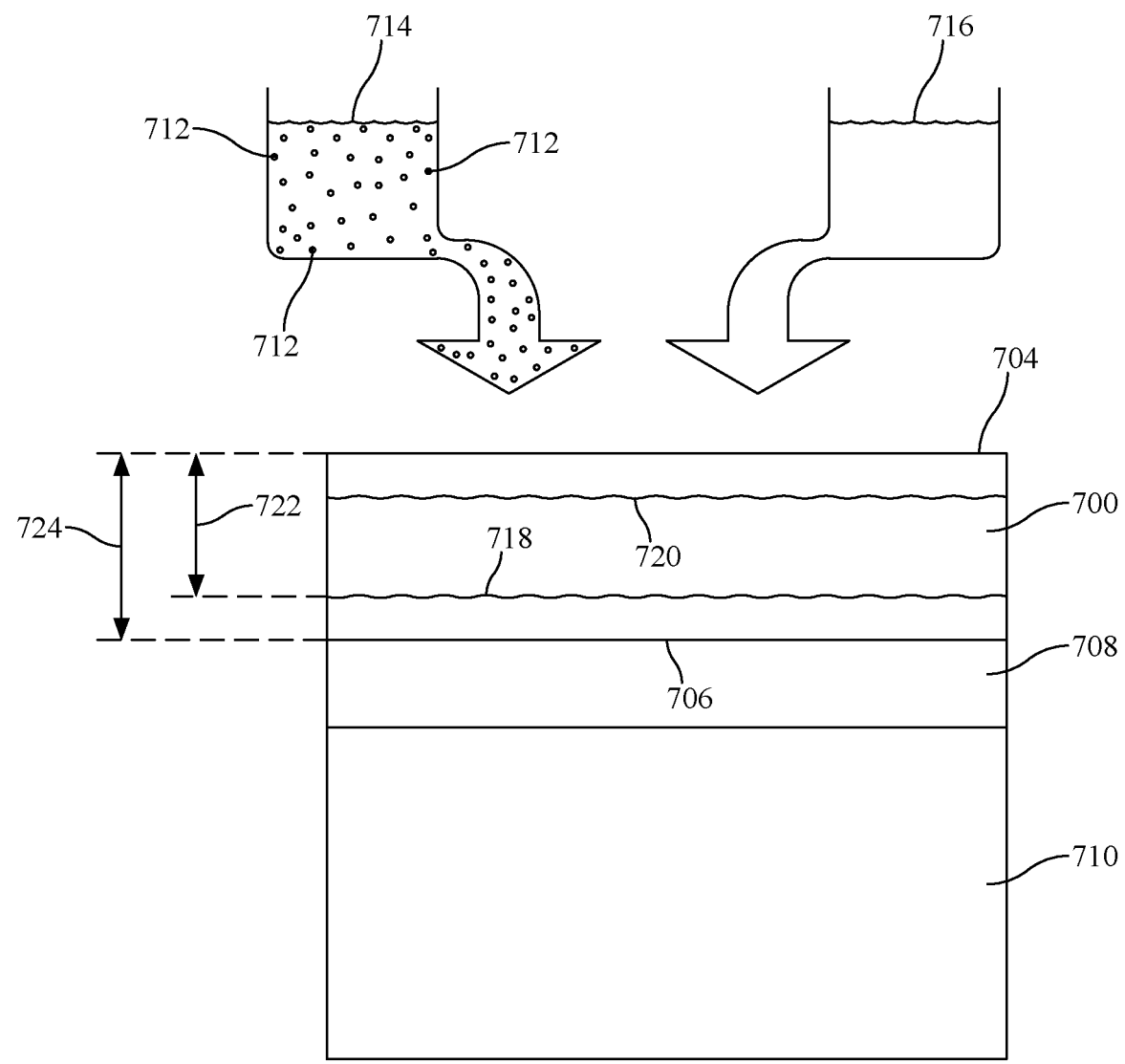
FIG. 10 is a schematic representation of a textile fabric with polymer or polymeric particles introduced as a solution or suspension.

Referring now to FIG. 10, exemplary embodiments are directed to a method for stabilizing a surface of a textile fabric. A desired textile fabric 700 is selected. The textile fabric includes a top surface 702 and a bottom surface 704 opposite the top surface. In one embodiment, a nonwoven textile fabric formed with filaments or staple fibers is selected. The nonwoven textile fabric has a flat top surface. Alternatively, a textile fabric containing a plurality of looping yarns entering and exiting the top surface is selected. The looping yarns in the plurality of looping yarns include an upper portion of the yarns adjacent the top surface. In one embodiment, the textile fabric is a generally planar fabric. The textile fabric can be embossed with a coarse pattern containing elevated areas and depressed areas, as illustrated, for example, in FIGS. 5 and 7. The textile fabric can be incorporated into a composite containing one or more additional layers attached to the bottom surface of the textile fabric. Suitable additional layers include, but are not limited to, barrier layers 708 and backing layers 710 including cushioning backing layers. The composite can also be embossed with a coarse pattern.

In one embodiment, a plurality of polymeric particles 712 are suspended in a liquid 714 to create a liquid suspension of polymeric particles. As an alternative to a liquid suspension of polymeric particles, at least one polymer is dissolved in a solvent to create a polymeric solution. In one embodiment, additives are incorporated into the liquid suspension of polymeric particles or polymeric solution. These additives have a melting point above the melting points of the polymer particles and polymers used to make the suspension or solution. Therefore, the melting point of the additives is greater than any heat applied to the textile fabric to activate or melt the polymer particles or polymers. The additives affect at least one of a color of the textile fabric, an abrasiveness of the textile fabric, an absorptiveness of the textile fabric and antimicrobial properties of the textile fabric. In one embodiment, a repellent is introduced into the liquid suspension of particles or the polymeric solution.

The liquid suspension of polymeric particles or polymeric solution is applied to the top surface of the textile fabric or to the entire textile fabric. Suitable methods for applying the liquid suspension of polymeric particles or polymeric solution include, but are not limited to, immersion, spraying, rolling and brushing. When the suspension or solution is applied only to the surface, an initial volume of the liquid suspension of polymeric particles or polymeric solution is applied to the top surface. This initial volume is sufficient to penetrate 718 from the top surface into the textile fabric a penetration depth 722 that is less than a thickness 724 of the textile fabric. When the textile fabric includes looping yarns having an upper portion adjacent the top surface, the penetration depth is limited to the upper portion of the looping yarns. When the textile fabric has been embossed with a coarse, three-dimensional pattern, the liquid suspension of polymeric particles or the polymeric solution is applied only to the elevated areas of the textile fabric embossed with the coarse pattern.

An additional volume of the liquid or the solvent 716 is added or applied to the top surface of the textile fabric that already contains the liquid suspension of polymeric particles or the polymeric solution. This additional volume is sufficient to carry at least a portion of the plurality of polymeric particles of polymer in solution into the textile fabric to a point within the textile fabric 720 that is below and away from the top surface. Preferably, the additional volume of liquid or solvent is sufficient to carry all of the polymer particles or polymer in solution to the point in the textile fabric away from the top surface. Suitable methods for applying the additional volume of liquid or solvent include, but are not limited to, wet brushing the liquid or solvent onto the top surface, wet rolling the liquid or solvent onto the top surface, spraying the liquid or solvent onto the top surface and combinations thereof.

In one embodiment, additives are incorporated into the additional volume of liquid or solvent. These additives have a melting point above the melting points of the polymer particles and polymers used to make the suspension or solution. Therefore, the melting point of the additives is greater than any heat applied to the textile fabric to activate or melt the polymer particles or polymers. The additives affect at least one of a color of the textile fabric, an abrasiveness of the textile fabric, an absorptiveness of the textile fabric and antimicrobial properties of the textile fabric. In one embodiment, a repellent is introduced into the additional volume of liquid or solvent.

Heat, vacuum, forced air or combinations thereof are applied to at least one of the top surface, the bottom surface or to the entire the textile fabric or the composite containing the textile fabric, for example, in an air circulating oven or finishing frame. Suitable mechanisms for applying heat include, but are not limited to, conduction, convection and thermal radiation. Conduction utilizes either flat heated plates or textured heated plates. The textured heated plates embossed a three-dimensional pattern into the textile fabric or composite while transferring heat into the textile fabric. The heated plates are applied either with or without pressure applied to the textile fabric. The applied heat is sufficient to evaporate at least a portion the liquid or solvent applied to the textile fabric. Preferably, the applied heat is sufficient to evaporate all liquid and solvent applied to the textile fabric.

The applied heat is also sufficient to melt, in situ, the plurality of polymer particles or the polymer contained in solution.

In one embodiment, the heat-set textile fabric containing the melted polymeric particles or melted polymer is needled with smooth fine needles to allow free water vapor penetration through the textile fabric.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for improving abrasion resistance in a top surface of a textile fabric, the method comprising:
    suspending a plurality of low-melting polymeric adhesive particles having a particle melting point that is lower than a melting point of fibers forming the top surface in a liquid to create a liquid suspension of low-melting polymeric adhesive particles;
    applying the liquid suspension of low-melting polymeric adhesive particles to the textile fabric;
    applying a volume of additional liquid without any low-melting polymeric adhesive particles to the top surface of the textile fabric, the volume sufficient to carry at least a portion of the plurality of low-melting polymeric adhesive particles into the textile fabric and away from the top surface; and
    applying heat to the textile fabric after applying the volume of the additional liquid, the heat sufficient to evaporate the liquid applied to the textile fabric and to melt the plurality of low-melting polymer adhesive particles in situ without melting the fibers forming the top surface.

2. The method of claim 1, wherein applying the liquid suspension comprises immersing the textile fabric in the liquid suspension.

3. The method of claim 1, wherein applying the liquid suspension comprises applying the liquid suspension uniformly to a top surface of the textile fabric.

4. The method of claim 1, wherein at least a portion of the low-melting polymeric adhesive particles comprise a chemical composition compatible with fibers in the textile fabric to form chemical bonds with the fibers.

5. The method of claim 1, wherein at least portion of the low-melting polymeric adhesive particles comprise ground recycled textile products.

6. The method of claim 1, wherein suspending the plurality of low-melting polymeric adhesive particles comprises suspending a plurality of polyester, polyethylene, polypropylene polyurethane, polyvinyl acetate, polyvinyl alcohol, polyamide or acrylic particles.

7. The method of claim 1, wherein applying the liquid suspension further comprises applying an initial volume of the liquid suspension to the top surface of the textile fabric, the initial volume sufficient to penetrate from the top surface into the textile fabric with a penetration depth that is less than a thickness of the textile fabric.

8. The method of claim 1, wherein applying the volume of the additional liquid comprises wet brushing the liquid onto the top surface, wet rolling the liquid onto the top surface, spraying the liquid onto the top surface, or combinations thereof.

9. The method of claim 1, wherein the liquid comprises water containing surfactants and the additional liquid comprises only water.

10. The method of claim 1, wherein the method further comprises incorporating additives comprising a melting point that is higher than a temperature of the step of applying heat to the textile fabric into at least one of the liquid suspension of particles and the volume of the additional liquid, the additives affecting at least one of a color of the textile fabric, an abrasiveness of the textile fabric, an absorptiveness of the textile fabric and antimicrobial properties of the textile fabric.

11. The method of claim 1, wherein the method further comprises selecting a textile fabric comprising a plurality of looping yarns, the plurality of looping yarns comprising an upper portion adjacent the top surface.

12. The method of claim 1, wherein:
    the method further comprises embossing the textile fabric with a coarse pattern comprising elevated areas and depressed areas before the application of the liquid suspension of the low-melting polymeric adhesive particles to the textile fabric; and
    applying the liquid suspension further comprises applying the liquid suspension of low-melting polymeric adhesive particles only to the elevated areas of the textile fabric embossed with the coarse pattern.

13. The method of claim 1, wherein the method further comprises adding a repellent into at least one of the liquid suspension of particles and the volume of the additional liquid.

14. The method of claim 1, wherein the method further comprises needling the textile fabric comprising melted polymeric particles with smooth fine needles to facilitate water vapor penetration through the textile fabric.

15. A method for improving abrasion resistance of a top surface of a textile fabric, the method comprising:
    depositing a layer of low-melting polymeric adhesive particles having a particle melting point lower than a melting point of fibers forming the top surface of the fabric onto the top surface of the textile fabric;
    applying, subsequent to the deposition of the layer of low-melting polymeric adhesive particles onto the top surface of the textile fabric, a volume of liquid onto the top surface to cause at least a portion of the particles deposited onto the top surface to be driven below the top surface; and
    applying heat to the fabric to evaporate the applied volume of liquid and to melt the low-melting polymeric adhesive particles in situ.

16. The method of claim 15, wherein depositing the layer of low-melting polymeric adhesive particles comprising sifting the low-melting polymeric adhesive particles or blowing the low-melting polymeric adhesive particles with air.

17. The method of claim 16, wherein the method further comprises applying vacuum to a bottom surface of the textile fabric opposite the top surface while depositing the layer of low-melting polymeric adhesive particles.

18. The method of claim 15, wherein applying the volume of liquid comprises wet brushing, wet rolling, or spraying.

* * * * *